(12) United States Patent
Awadh et al.

(10) Patent No.: US 12,458,955 B2
(45) Date of Patent: *Nov. 4, 2025

(54) AQUEOUS SOLUTION METHOD FOR FORMING HYDRODESULFURIZATION CATALYST

(71) Applicant: King Fahd University of Petroleum and Minerals, Dhahran (SA)

(72) Inventors: Tawfik Abdo Saleh Awadh, Dhahran (SA); Umar Cheche Abubakar, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 822 days.

This patent is subject to a terminal disclaimer.

(21) Appl. No.: 17/710,205

(22) Filed: Mar. 31, 2022

(65) Prior Publication Data

US 2022/0219148 A1 Jul. 14, 2022

Related U.S. Application Data

(63) Continuation of application No. 16/274,347, filed on Feb. 13, 2019, now Pat. No. 11,325,107.

(51) Int. Cl.
*B01J 23/883* (2006.01)
*B01J 35/61* (2024.01)
(Continued)

(52) U.S. Cl.
CPC ........... *B01J 23/883* (2013.01); *B01J 35/615* (2024.01); *B01J 35/617* (2024.01); *B01J 35/633* (2024.01);
(Continued)

(58) Field of Classification Search
None
See application file for complete search history.

(56) References Cited

U.S. PATENT DOCUMENTS 5,484,756 A * 1/1996 Isomae ................. B01J 27/188
502/332
9,636,662 B2 5/2017 Choi et al.
(Continued)

FOREIGN PATENT DOCUMENTS

CN 108520955 A 9/2018
EP 2 899 239 B1 12/2016

OTHER PUBLICATIONS

Tseng et al.; Reprocessing of Used Tires into Activated Carbon and Other Products; Ind. Eng. Chem. Res.; 34, 3102-3111; 1995.*

(Continued)

*Primary Examiner* — Guinever S Gregorio
(74) *Attorney, Agent, or Firm* — Oblon, McClelland, Maier & Neustadt, L.L.P.

(57) ABSTRACT

A method of making a hydrodesulfurization catalyst having nickel and molybdenum supported on activated carbon is specified. The hydrodesulfurization catalyst produced is mesoporous having an average pore diameter of 4-10 nm and a BET surface area of 250-500 m²/g. The utilization of the hydrodesulfurization catalyst in treating a hydrocarbon feedstock containing aromatic sulfur compounds (e.g. dibenzothiophene) to produce a desulfurized hydrocarbon stream is also provided.

8 Claims, 15 Drawing Sheets

(51) Int. Cl.
*B01J 35/63* (2024.01)
*B01J 35/64* (2024.01)
*B01J 37/04* (2006.01)
*B01J 37/08* (2006.01)
*B01J 37/34* (2006.01)
*C10G 45/08* (2006.01)
*B01J 35/70* (2024.01)

(52) U.S. Cl.
CPC ........... *B01J 35/635* (2024.01); *B01J 35/638* (2024.01); *B01J 35/647* (2024.01); *B01J 37/04* (2013.01); *B01J 37/08* (2013.01); *B01J 37/343* (2013.01); *C10G 45/08* (2013.01); *B01J 35/70* (2024.01); *B01J 2235/00* (2024.01); *B01J 2235/10* (2024.01); *B01J 2235/15* (2024.01); *B01J 2235/30* (2024.01)

(56) References Cited

U.S. PATENT DOCUMENTS

| | | | | |
|---|---|---|---|---|
| 2009/0230026 | A1* | 9/2009 | Choi | C10G 45/08 502/316 |
| 2010/0224535 | A1* | 9/2010 | Maity | B01J 21/18 208/143 |
| 2015/0255800 | A1* | 9/2015 | Feaver | H01M 4/463 429/405 |
| 2018/0100107 | A1 | 4/2018 | Alhooshani et al. | |
| 2018/0369791 | A1* | 12/2018 | Paranthaman | C11C 3/003 |
| 2022/0219149 | A1* | 7/2022 | Awadh | B01J 23/882 |

OTHER PUBLICATIONS

SpringerLink : Surface Carbon Activated NiMo/TiO Catalyst Towards Highly Efficient Hydrodesulfurization Reaction ; Catalysis Surveys from Asia, vol. 19, Issue 2 ; pp. 78-87 ; Feb. 11, 2015 ; 2 Pages ; Abstract Only.

Ganiyu, et al. ; Synthesis of a Ti-SBA-15-NiMo Hydrodesulfurization Catalyst: The Effect of the Hydrothermal Synthesis Temperature of NiMo and Molybdenum Loading on the Catalytic Activity ; Industrial & Engineeering Chemistry Research 56 (18) ; pp. 5201-5209 ; Apr. 23, 2017 : 1 Page ; Abstract Only.

Lie, et al. : A TiO /AC composite photocatalyst with high activity and easy separation prepared by a hydrothermal method ; Journal of Hazardous Materials, vol. 142, Issues 1-2 ; pp. 257-263 ; Abstract Only ; May 8, 2007 ; 1 Page.

Solomon et al.; Reprocessing of Used Tires into Activated Carbon and Other Products; Ind. Eng. Chem. Res.; 34, 3102-3111; 1995.

* cited by examiner

AQUEOUS SOLUTION METHOD FOR FORMING HYDRODESULFURIZATION CATALYST

CROSS-REFERENCE TO RELATED APPLICATIONS

The present application is a Continuation of U.S. application Ser. No. 16/274,347, now allowed, having a filing date of Feb. 13, 2019.

BACKGROUND OF THE INVENTION

Technical Field

The present disclosure relates to a method of making hydrodesulfurization catalyst containing nickel and molybdenum and a process of utilizing the catalyst in hydrodesulfurization of a hydrocarbon feedstock.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Crude oil is a valuable source of energy and raw material for major industries worldwide. However, the presence of sulfur compounds such as thiophenes in crude oil precludes its application in fuel cells, leads to environmental pollution, and increases refining costs due to catalyst poisoning and corrosion of refining equipment [Y. Wang, F. H. Yang, R. T. Yang, J. M. Heinzel, and A. D. Nickens, "Desulfurization of high-sulfur jet fuel by π-complexation with copper and palladium halide sorbents," Ind. Eng. Chem. Res., vol. 45, no. 22, pp. 7649-7655, 2006; C. Song, "An overview of new approaches to deep desulfurization for ultra-clean gasoline, diesel fuel and jet fuel," Catal. Today, vol. 86, no. 1-4, pp. 211-263, 2003; and W. Li, J. Liu, and D. Zhao, "Mesoporous materials for energy conversion and storage devices," Nat. Rev. Mater., vol. 1, no. 6, p. 16023, 2016].

Sulfur containing compounds are found in most crude oil and other hydrocarbon fuels such as coal and natural gas as impurities. The combustion of fuels containing sulfur species, especially crude oil fractions such as gasoline, diesel, and jet fuels, often leads to emission of $SO_2$ gas and fine particles into the environment [S. Ma, L. Gao, J. Ma, X. Jin, J. Yao, and Y. Zhao, "Advances on simultaneous desulfurization and denitrification using activated carbon irradiated by microwaves," Environ. Technol., vol. 33, no. 11, pp. 1225-1230, 2012]. These emissions have deleterious impacts on the environment with consequences for human health and property. As the demand for cleaner fuels increases, desulfurization is a significant priority for improving crude oil refining processes. The complete desulfurization of fuels is likely inevitable as stringent regulations are enforced around the world in response to environmental concerns. For instance, US Environmental Protection Agency (EPA) has limited the allowable sulfur concentrations to 30 ppmw and 15 ppmw for gasoline and highway diesel, respectively [C. Song, "An overview of new approaches to deep desulfurization for ultra-clean gasoline, diesel fuel and jet fuel," Catal. Today, vol. 86, no. 1-4, pp. 211-263, 2003].

Although hydrodesulfurization (HDS) ensures an efficient removal of light sulfur species such as mercaptans, sulfides, and disulfides, some organosulfur compounds such as thiophenes and derivatives remain quite stable under conventional HDS conditions. HDS is ineffective for deep desulfurization because aromatic sulfur compounds such as thiophene, benzothiophene (BT), and 4,6-dimethyldibenzothiophene (DMDBT) remain unaffected under normal operating conditions. Effective removal of these aromatic sulfur compounds to low levels require more severe conditions and sophisticated infrastructures [A. H. M. S. Hussain and B. J. Tatarchuk, "Adsorptive desulfurization of jet and diesel fuels using $Ag/TiO_x$—$Al_2O_3$ and $Ag/TiO_x$—$SiO_2$ adsorbents," Fuel, vol. 107, no. 0, pp. 465-473, 2013; S. A. Ganiyu, S. A. Ali, and K. Alhooshani, "Simultaneous HDS of DBT and 4,6-DMDBT over single-pot Ti-SBA-15-NiMo catalysts: influence of Si/Ti ratio on the structural properties, dispersion and catalytic activity," RSC Adv., vol. 7, no. 35, pp. 21943-21952, 2017; S. Nair and B. J. Tatarchuk, "Supported silver adsorbents for selective removal of sulfur species from hydrocarbon fuels," Fuel, vol. 89, no. 11, pp. 3218-3225, 2010; and R. T. Yang, Fundamentals and applications. 2001, each incorporated herein by reference in their entirety]. Hence, facile alternative desulfurization methods under mild operation conditions are continuously being investigated.

Desulfurization is one of the key routine processes carried out in most crude oil refineries around the globe. Conventional hydrodesulfurization technology is widely used for desulfurization. The process often involves utilizing a HDS catalyst at a high temperature (300-450° C.) and under a high $H_2$ pressure (3-5 MPa) to yield hydrocarbon fuels containing lower amounts of sulfur [S. Brunet, D. Mey, G. Pe'rot, C. Bouchy, and F. Diehl, "On the hydrodesulfurization of FCC gasoline: A review," Applied Catalysis A: General, vol. 278, no. 2. pp. 143-172, 2005, incorporated herein by reference in its entirety]. However, thiophene (TP) and other related organosulfur compounds such as benzothiophenes (BT), methylbenzothiophenes (MBT), and dimethylbenzothiophenes (DMBT) are common contaminants found in crude oil. These aromatic contaminants are stable and therefore difficult to remove by conventional means. The conventional HDS technique ensures the removal of non-aromatic compounds having sulfur species of low molar mass while the remaining refractory contaminants are often concentrated in higher boiling fractions of the crude oil [D. D. Link and P. Zandhuis, "The distribution of sulfur compounds in hydrotreated jet fuels: Implications for obtaining low-sulfur petroleum fractions," Fuel, vol. 85, no. 4. pp. 451-455, 2006, incorporated herein by reference in its entirety]. Consequently, further desulfurization is required in order to guarantee safe and efficient utilization of these fuels.

In view of the forgoing, one objective of the present disclosure is to provide a method of producing a hydrodesulfurization catalyst having nickel and molybdenum supported by activated carbon. Another objective of the present disclosure is to provide a process of desulfurizing a hydrocarbon feedstock catalyzed by the resulting hydrodesulfurization catalyst.

BRIEF SUMMARY OF THE INVENTION

According to a first aspect, the present disclosure relates to a method of producing a Ni/Mo hydrodesulfurization catalyst having nickel and molybdenum disposed on an activated carbon. The method involves the steps of mixing an activated carbon with a Ni(II) salt and a Mo(VI) salt in a solvent to form a mixture, drying the mixture at a temperature of 50-150° C., thereby producing the Ni/Mo hydrodesulfurization catalyst. The Ni/Mo hydrodesulfurization catalyst is mesoporous with a BET surface area of 250-500 m$^2$/g, an average pore diameter of 4-10 nm, and a pore volume of 0.2-3 cm$^3$/g.

In one embodiment, the method further involves calcining the Ni/Mo hydrodesulfurization catalyst at a temperature of 160-500° C.

In one embodiment, the Ni/Mo hydrodesulfurization catalyst is calcined at a temperature of 160-200° C.

In one embodiment, the mixture further comprises a chelating agent which is ethylenediaminetetraacetic acid, citric acid, or both.

In one embodiment, the method further involves subjecting the mixture to ultrasonication.

In one embodiment, the method further involves granulating and pyrolyzing waste tires to form the activated carbon.

In one embodiment, the activated carbon has a BET surface area of 500-700 m$^2$/g, an average pore diameter of 3-8 nm, and a pore volume of 0.25-4 cm$^3$/g.

In one embodiment, the Ni/Mo hydrodesulfurization catalyst has an activated carbon content in a range of 60-95% by weight relative to a total weight of the Ni/Mo hydrodesulfurization catalyst.

In one embodiment, the Ni(II) salt is nickel(II) acetate.

In one embodiment, the Mo(VI) salt is ammonium molybdate(VI).

In one embodiment, the Ni/Mo hydrodesulfurization catalyst has a Ni:Mo molar ratio in a range of 1:10 to 1:2.

In one embodiment, the Ni/Mo hydrodesulfurization catalyst has a Mo content in a range of 4-20% by weight relative to a total weight of the Ni/Mo hydrodesulfurization catalyst.

According to a second aspect, the present disclosure relates to a method for desulfurizing a hydrocarbon feedstock comprising a sulfur-containing compound. The method involves contacting the hydrocarbon feedstock with a Ni/Mo hydrodesulfurization catalyst in the presence of H$_2$ gas to convert at least a portion of the sulfur-containing compound into a mixture of H$_2$S and a desulfurized product, and removing the H$_2$S from the mixture, thereby forming a desulfurized hydrocarbon stream, wherein (i) the Ni/Mo hydrodesulfurization catalyst comprises nickel and molybdenum disposed on an activated carbon, (ii) the Ni/Mo hydrodesulfurization catalyst has an activated carbon content in a range of 60-95% by weight, a Mo content of 4-20% by weight, each relative to a total weight of Ni/Mo hydrodesulfurization catalyst, and a Ni:Mo molar ratio of 1:10 to 1:2, and (iii) the Ni/Mo hydrodesulfurization catalyst is mesoporous with a BET surface area of 250-500 m$^2$/g, an average pore diameter of 4-10 nm, and a pore volume of 0.2-3 cm$^3$/g.

In one embodiment, the hydrocarbon feedstock is contacted with the Ni/Mo hydrodesulfurization catalyst at a temperature in a range of 150 to 500° C. for 0.1-10 hours.

In one embodiment, a pressure of the H$_2$ gas is in a range of 2 to 10 MPa.

In one embodiment, the sulfur-containing compound is present in the hydrocarbon feedstock at a concentration of 0.01-10% by weight relative to a total weight of the hydrocarbon feedstock.

In one embodiment, the sulfur-containing compound is at least one selected from the group consisting of a sulfide, a disulfide, a thiophene, a benzothiophene, and a dibenzothiophene.

In one embodiment, the sulfur-containing compound is dibenzothiophene.

In one embodiment, the sulfur content of the desulfurized hydrocarbon stream is 20-99% by weight less than that of the hydrocarbon feedstock.

In one embodiment, the method further involves treating the Ni/Mo hydrodesulfurization catalyst with a mixture comprising H$_2$ gas at a temperature of 250 to 500° C. to form a reduced Ni/Mo hydrodesulfurization catalyst, and presulfiding the reduced Ni/Mo hydrodesulfurization catalyst with a sulfide-containing solution at a temperature of 250 to 500° C., prior to the contacting.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

AC100), 200° C. (NiMo/AC200), 300° C. (NiMo/AC300), and 400° C. (NiMo/AC400), respectively.

Figure 16:
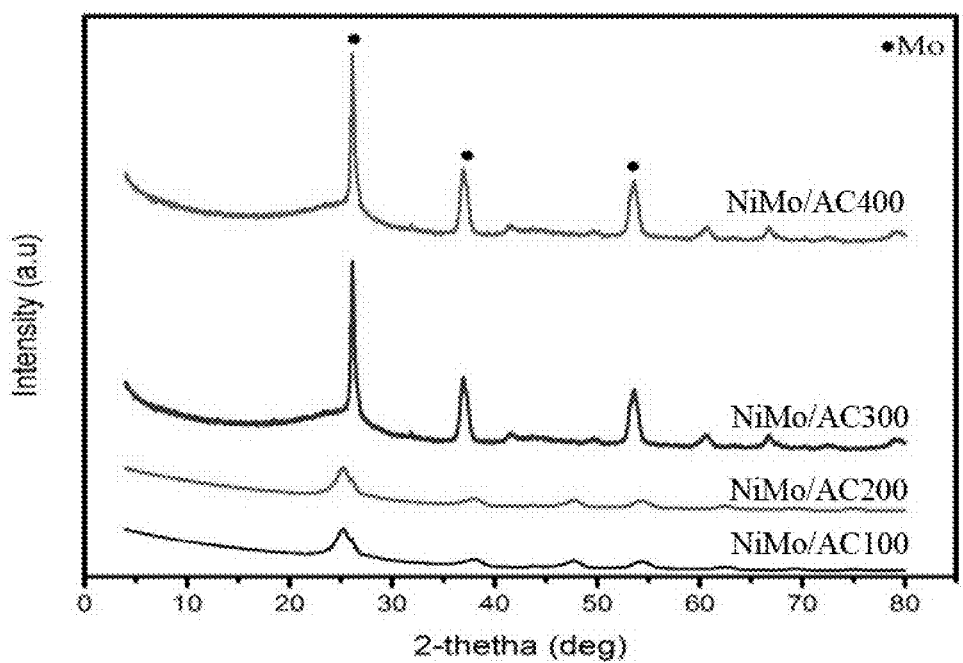

FIG. 16 is an overlay of X-ray diffraction patterns of activated carbon supported Ni/Mo catalysts calcined at 100° C. (NiMo/AC100), 200° C. (NiMo/AC200), 300° C. (NiMo/AC300), and 400° C. (NiMo/AC400), respectively.

Figure 17:
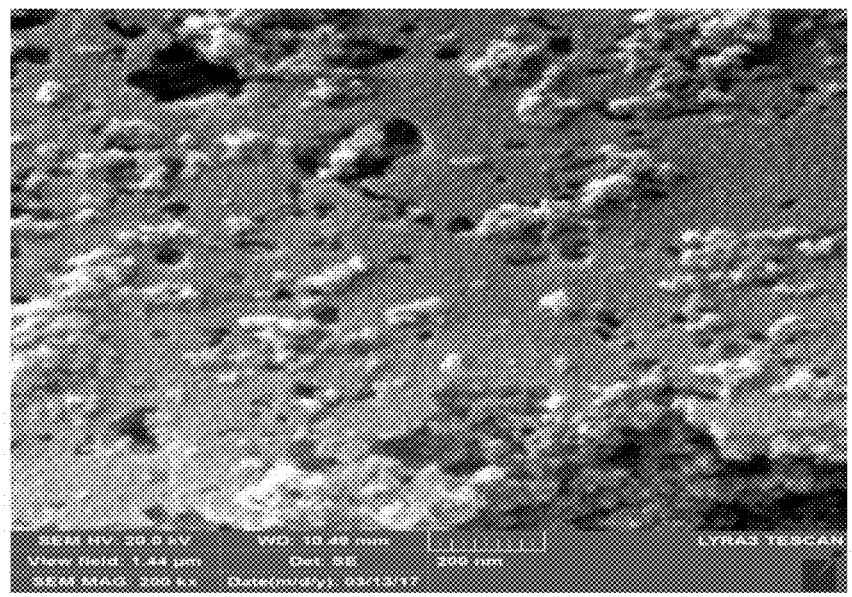

FIG. 17 is an SEM image of an activated carbon supported Ni/Mo catalyst.

Figure 18:
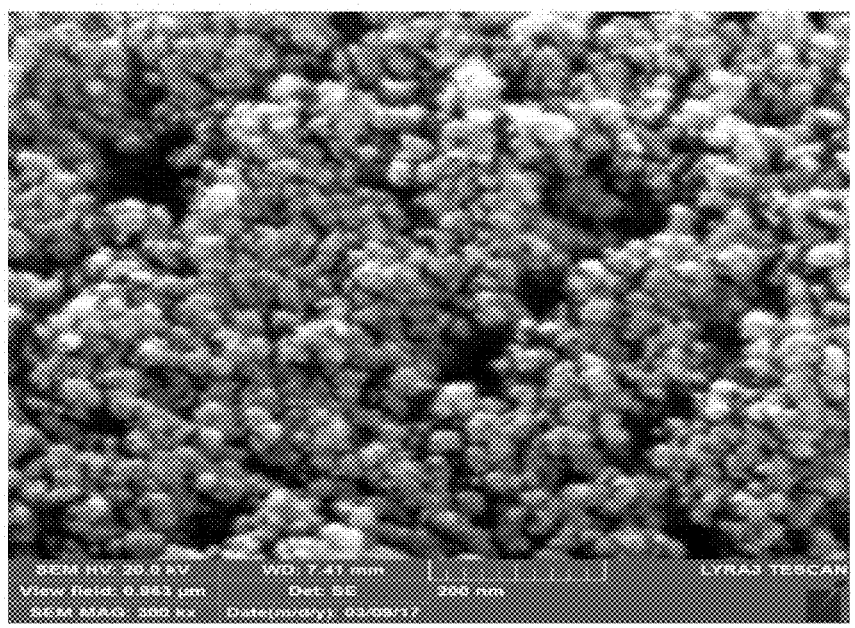

FIG. 18 is a magnified view of the sample in FIG. 17.

Figure 19:
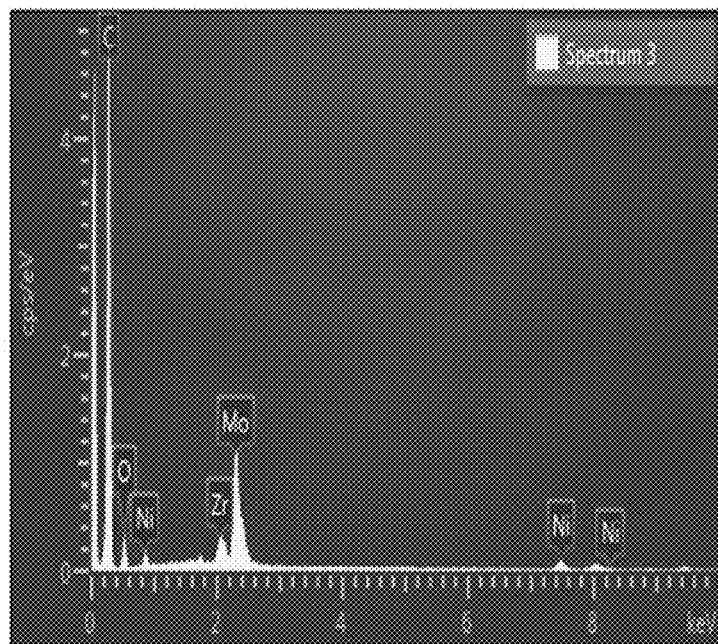

FIG. 19 is an energy dispersive X-ray spectroscopy (EDX) spectrum of an activated carbon supported Ni/Mo catalyst.

Figure 20:
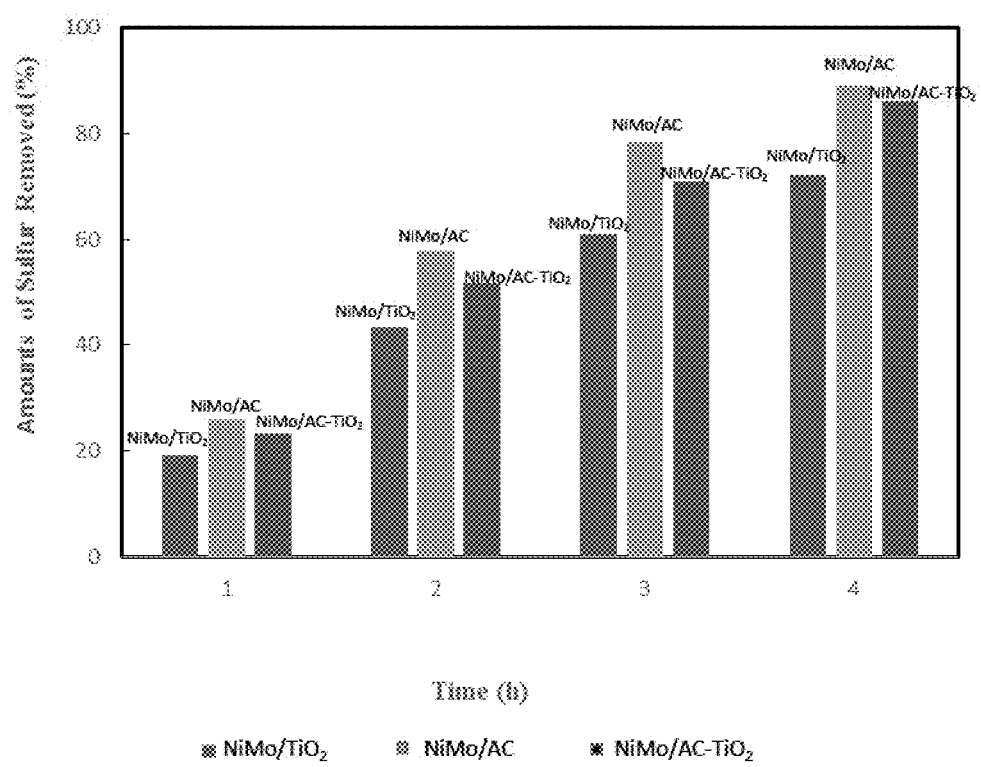

FIG. 20 is a bar graph illustrating hydrodesulfurization catalytic activities of a $TiO_2$ supported Ni/Mo catalyst, an activated carbon supported Ni/Mo catalyst, and an activated carbon-$TiO_2$ composite supported Ni/Mo catalyst, respectively, at different contact times.

Figure 21A:
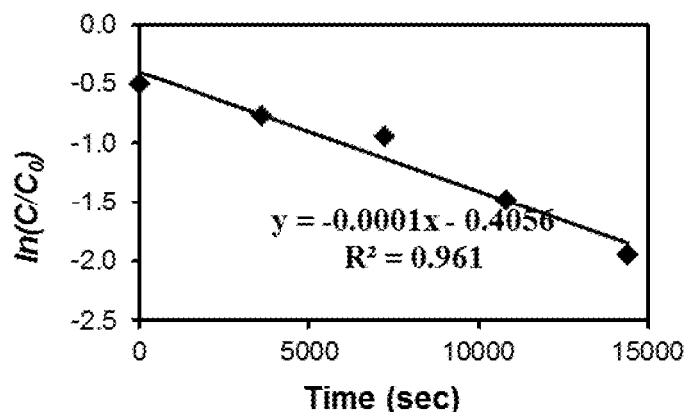

FIG. 21A is a kinetic plot for hydrodesulfurization activity of a $TiO_2$ supported Ni/Mo catalyst.

Figure 21B:
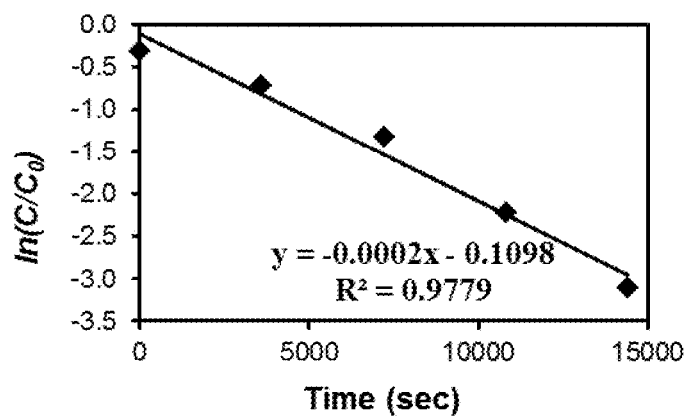

FIG. 21B is a kinetic plot for hydrodesulfurization activity of an activated carbon-$TiO_2$ composite supported Ni/Mo catalyst.

Figure 21C:
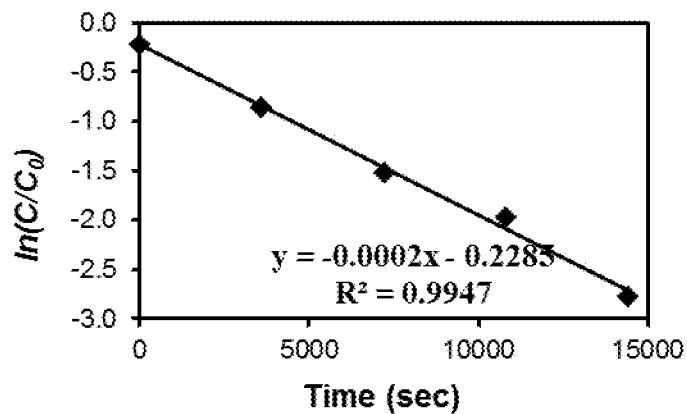

FIG. 21C is a kinetic plot for hydrodesulfurization activity of an activated carbon supported Ni/Mo catalyst.

Figure 22:
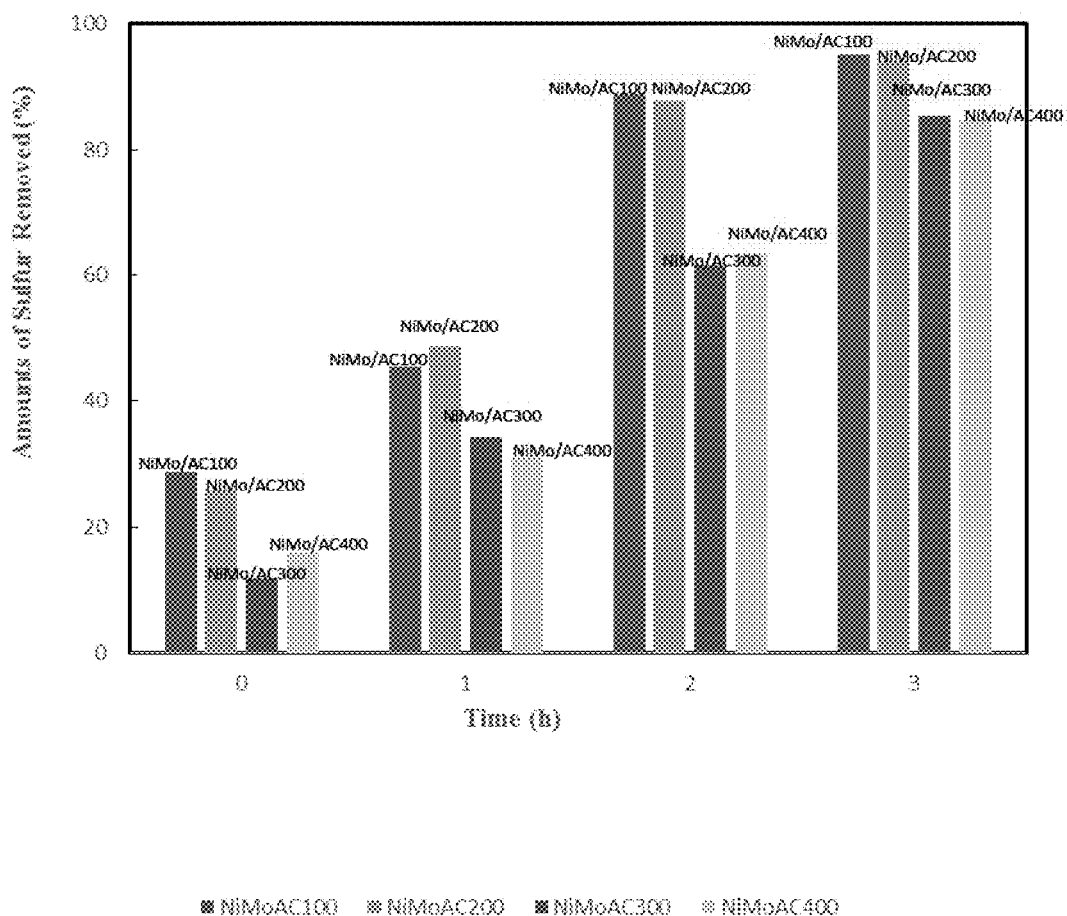

FIG. 22 is a bar graph illustrating hydrodesulfurization catalytic activities of activated carbon supported Ni/Mo catalysts calcined at 100° C. (NiMo/AC100), 200° C. (NiMo/AC200), 300° C. (NiMo/AC300), and 400° C. (NiMo/AC400), respectively, at different contact times.

Figure 23A:
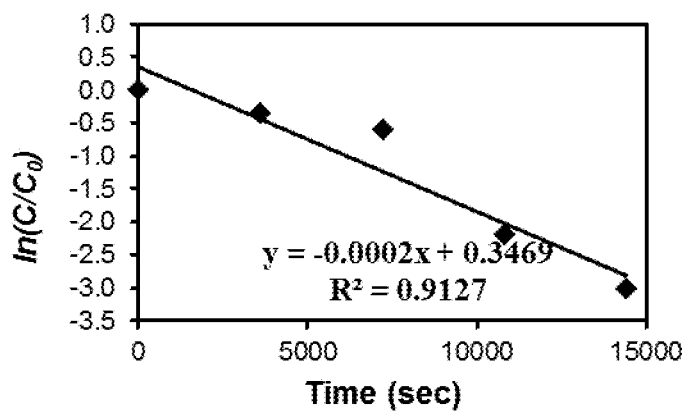

FIG. 23A is a kinetic plot for hydrodesulfurization activity of an activated carbon supported Ni/Mo catalysts calcined at 100° C.

Figure 23B:
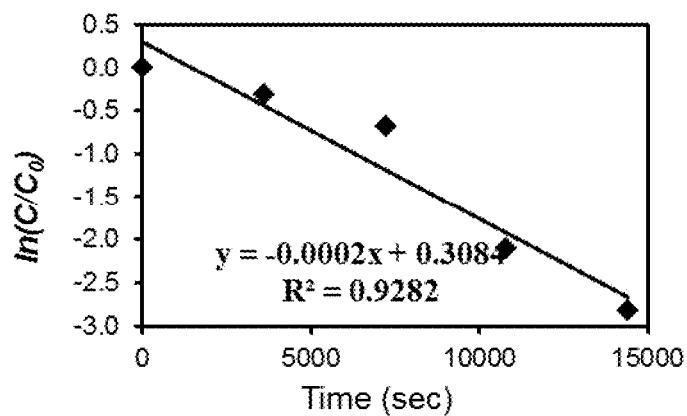

FIG. 23B is a kinetic plot for hydrodesulfurization activity of an activated carbon supported Ni/Mo catalysts calcined at 200° C.

Figure 23C:
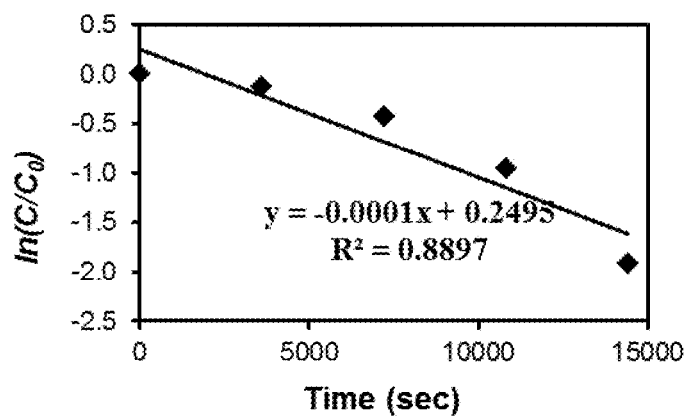

FIG. 23C is a kinetic plot for hydrodesulfurization activity of an activated carbon supported Ni/Mo catalysts calcined at 300° C.

Figure 23D:
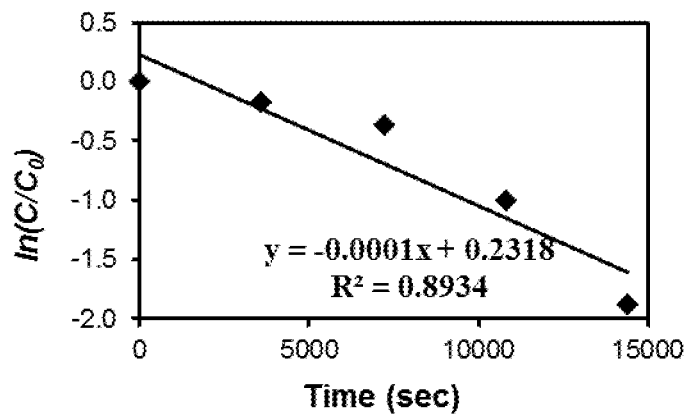

FIG. 23D is a kinetic plot for hydrodesulfurization activity of an activated carbon supported Ni/Mo catalysts calcined at 400° C.

Figure 24:
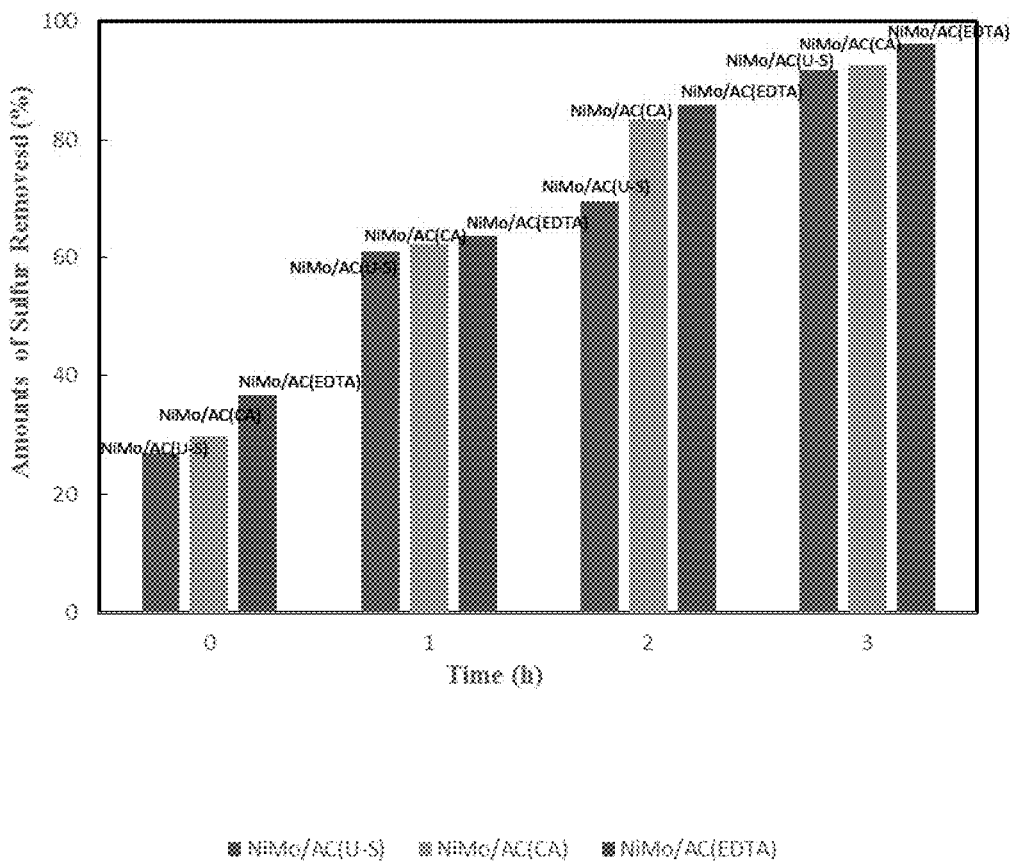

FIG. 24 is a bar graph illustrating hydrodesulfurization catalytic activities of activated carbon supported Ni/Mo catalysts prepared using ultrasonication (NiMo/AC(U-S)), citric acid (NiMo/AC(CA)), and EDTA (NiMo/AC(EDTA)), respectively, at different contact times.

Figure 25A:
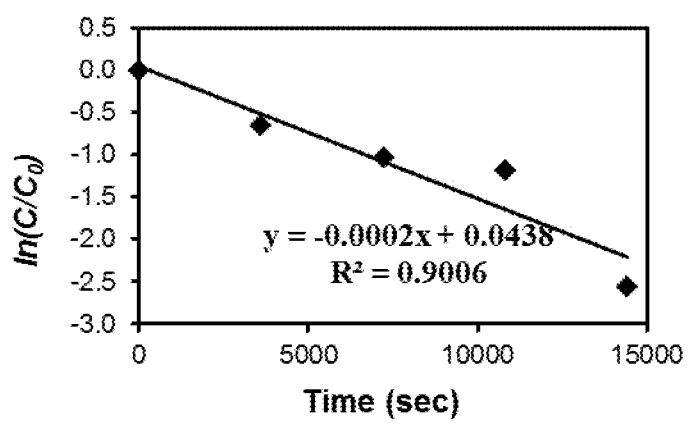

FIG. 25A is a kinetic plot for hydrodesulfurization activity of an activated carbon supported Ni/Mo catalysts prepared using ultrasonication.

Figure 25B:
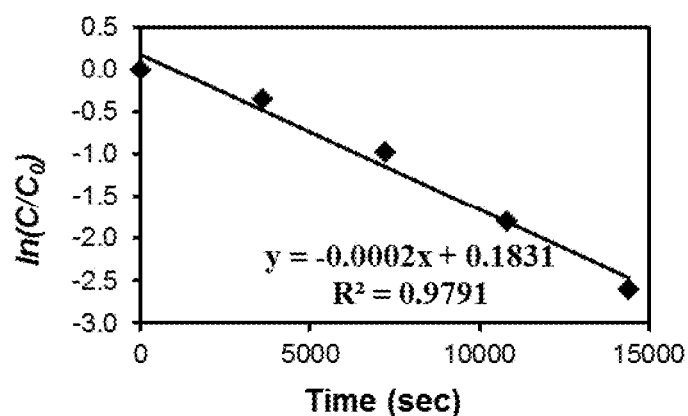

FIG. 25B is a kinetic plot for hydrodesulfurization activity of an activated carbon supported Ni/Mo catalysts prepared using citric acid.

Figure 25C:
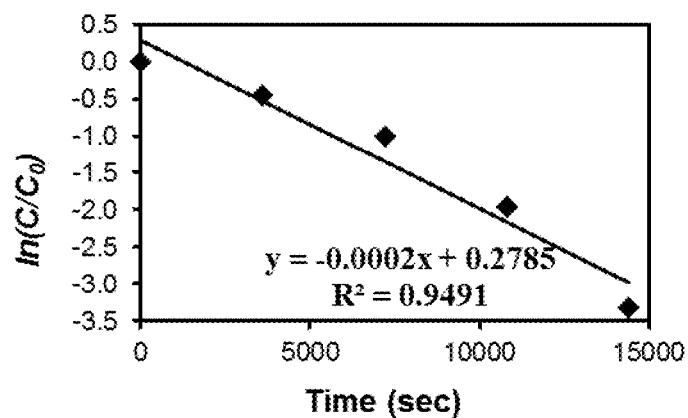

FIG. 25C is a kinetic plot for hydrodesulfurization activity of an activated carbon supported Ni/Mo catalysts prepared using EDTA.

DETAILED DESCRIPTION OF THE EMBODIMENTS

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

The term "microporous" refers to a surface having an average pore diameter of less than 2 nm, while the term "mesoporous" refers to a surface having an average pore diameter of 2-50 nm.

As used herein, "compound" is intended to refer to a chemical entity, whether as a solid, liquid, or gas, and whether in a crude mixture or isolated and purified.

The present disclosure includes all hydration states of a given salt or formula, unless otherwise noted. For example, nickel(II) acetate includes anhydrous $Ni(OCOCH_3)_2$, tetrahydrate $Ni(OCOCH_3)_2 \cdot 4H_2O$, and any other hydrated forms or mixtures. Ammonium heptamolybdate(VI) includes anhydrous $(NH_4)_6Mo_7O_{24}$, and hydrated forms such as ammonium heptamolybdate tetrahydrate $(NH_4)_6Mo_7O_{24} \cdot 4H_2O$.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of oxygen include $^{16}O$, $^{17}O$ and $^{18}O$, isotopes of nickel include $^{58}Ni$, $^{60-62}Ni$, and $^{64}Ni$, and isotopes of molybdenum include $^{92}Mo$, $^{94-98}Mo$, and $^{100}Mo$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

A first aspect of the present disclosure relates to a method of making a Ni/Mo hydrodesulfurization catalyst having nickel and molybdenum disposed on an activated carbon. The method involves the steps of mixing an activated carbon with a Ni(II) salt and a Mo(VI) salt in a solvent to form a mixture, and drying the mixture thereby producing the Ni/Mo hydrodesulfurization catalyst. The present method may further involve calcining the Ni/Mo hydrodesulfurization catalyst. This method may be considered a wetness impregnation technique, wherein a catalyst support material (e.g. activated carbon) is contacted with a solution of desired metal salts (e.g. Ni(II) and Mo(VI) salts).

As used herein, a catalyst support material refers to a material, usually a solid with a high surface area, to which a catalyst is affixed. The reactivity of heterogeneous catalyst and nanomaterial based catalysts occurs at the surface atoms. Thus, great effort is made herein to maximize the surface of a catalyst by distributing it over the support. The support may be inert or participate in the catalytic reactions. The support materials used in catalyst preparation play a role in determining the physical characteristics and performance of the catalysts. In a preferred embodiment, an activated carbon serves as a catalyst support material in the presently disclosed Ni/Mo hydrodesulfurization catalyst. The activated carbon may be in the form of powdered activated carbon, granular activated carbon, extruded activated carbon, bead activated carbon, impregnated carbon, polymer coated carbon but is not limited to such forms of activated carbon. In at least one embodiment, the activated carbon used herein is in the form of powdered activated carbon.

The Brunauer-Emmet-Teller (BET) theory (S. Brunauer, P. H. Emmett, E. Teller, J. Am. Chem. Soc. 1938, 60, 309-319, incorporated herein by reference) aims to explain the physical adsorption of gas molecules on a solid surface and serves as the basis for an important analysis technique for the measurement of a specific surface area of a material.

Specific surface area is a property of solids which is the total surface area of a material per unit of mass, solid or bulk volume, or cross sectional area. In most embodiments, pore diameter, pore volume, and BET surface area are measured by gas adsorption analysis, preferably $N_2$ adsorption analysis (e.g. $N_2$ adsorption isotherms). In one or more embodiments, the activated carbon used herein has a BET surface area of 500-700 $m^2/g$, preferably 520-680 $m^2/g$, preferably 540-660 $m^2/g$, preferably 560-640 $m^2/g$, preferably 570-620 $m^2/g$, preferably 580-600 $m^2/g$, or about 583 $m^2/g$. In at least one embodiment, the activated carbon used herein has a BET surface area that is greater than 500 $m^2/g$ and less than 1,000 $m^2/g$. In a related embodiment, the activated carbon has an average pore diameter of 3-8 nm, preferably 3.5-7.5 nm, preferably 4-7 nm, preferably 4.5-6.5 nm, preferably 5-6 nm, or about 5.2 nm. In another related embodiment, the activated carbon has a pore volume of 0.25-4 $cm^3/g$, preferably 0.5-3 $cm^3/g$, preferably 0.6-2.5 $cm^3/g$, preferably 0.7-2 $cm^3/g$, preferably 0.8-1.5 $cm^3/g$, preferably 0.9-1.2 $cm^3/g$, or about 1 $cm^3/g$.

In a preferred embodiment, the activated carbon is produced from waste tires. In one or more embodiments, the activated carbon is produced by granulating and pyrolyzing waste tires. For example, pieces of waste tires may be collected from a dumping site, cleaned with water, and optionally ground to granular form. The granules may be dried at a temperature of 80-160° C., 90-140° C., or 100-120° C. to form dried granules. The dried granules may be subjected to pyrolysis via heating at a temperature of 200-600° C., 250-550° C., 300-500° C., or 350-450° C. for 30-600 minutes, 60-500 minutes, 90-400 minutes, 120-300 minutes, 150-270 minutes, or 180-240 minutes to form carbonized particles. The pyrolysis may be conducted in inert gas (e.g. nitrogen, argon, helium) within an oven or furnace. Also, in some embodiments, the dried granules may not be pyrolyzed in inert gas, but in a vacuum. Further purification of the carbonized particles may be optionally accomplished via $H_2O_2$ treatment in order to eliminate adhering organic impurities. The carbonized particles may be activated by heating at a temperature of 350-950° C., 400-900° C., 450-850° C., 500-800° C., 550-750° C., or 600-700° C. for 1-8 hours, 2-7 hours, 3-6 hours, or about 5 hours to form the activated carbon. The activation may be performed within a steam-enriched muffle furnace or an oven. In certain embodiments, the carbonized particles may not be activated via heating in steam, but in air, or oxygen-enriched air.

Other support materials such as titanium dioxide ($TiO_2$), an activated carbon-$TiO_2$ composite, an alumina, a magnesia, a zirconia, a chromia, a zinc oxide, a thoria, a boria, a silica, a silica-alumina, a silica-magnesia, a chromia-alumina, an alumina-boria, a silica-zirconia, and zeolites may be used in addition to or in lieu of the activated carbon. In one embodiment, titanium dioxide (Example 3) having a BET surface area of 200-450 $m^2/g$, 250-400 $m^2/g$, 300-450 $m^2/g$, 325-400 $m^2/g$, or about 350 $m^2/g$ and an average pore diameter of 2-5 nm, 2.5-4.5 nm, or 3-4 nm is used as a support material for the preparation of the Ni/Mo hydrodesulfurization catalyst. In another embodiment, an activated carbon-$TiO_2$ composite (Example 4) having a BET surface area of 150-400 $m^2/g$, 200-350 $m^2/g$, 250-335 $m^2/g$, 275-320 $m^2/g$, or about 310 $m^2/g$ and an average pore diameter of 3-9 nm, 3.5-8 nm, 4-7 nm, 4.5-6 nm, or about 5.6 nm is used as a support material for the preparation of the Ni/Mo hydrodesulfurization catalyst. However, in at least one embodiment, the support material for the preparation of the Ni/Mo hydrodesulfurization catalyst disclosed herein consists essentially of the aforementioned activated carbon and is devoid of titanium dioxide and activated carbon-$TiO_2$ composite.

Exemplary suitable Ni(II) salts include, but are not limited to, nickel(II) acetate, nickel(II) acetate tetrahydrate, nickel(II) acetylacetonate, nickel(II) hexafluoroacetylacetonate, nickel(II) octanoate, ammonium nickel(II) sulfate, nickel(II) chloride, nickel(II) bromide, nickel(II) fluoride, nickel(II) iodide, nickel(II) carbonate, nickel(II) hydroxide, nickel(II) nitrate, nickel(II) perchlorate, nickel(II) sulfate, nickel(II) sulfamate, and mixtures thereof. In certain embodiments, a nickel salt having a different oxidation state, such as +1, +3, +4, may be used in addition to or in lieu of the Ni(II) salt. In a preferred embodiment, the Ni(II) salt used herein is nickel(II) acetate.

Exemplary suitable Mo(VI) salts include, but are not limited to, ammonium heptamolybdate(VI), ammonium heptamolybdate(VI) tetrahydrate, ammonium molybdate (VI), ammonium phosphomolybdate, ammonium tetrathiomolybdate, sodium molybdate(VI), lithium molybdate(VI), molybdenum(VI) dichloride dioxide, and mixtures thereof. In certain embodiments, a molybdenum salt having a different oxidation state, such as +2 (e.g. molybdenum(I) carboxylates), +3 (e.g. molybdenum(III) chloride), +4 (e.g. molybdenum(IV) carbonate), and +5 (e.g. molybdenum(V) chloride), may be used in addition to or in lieu of the Mo(VI) salt. Alternatively, a molybdenum acid, a molybdenum base may be used in addition to or in lieu of the Mo(VI) salt. In a preferred embodiment, the Mo(VI) salt used herein is ammonium heptamolybdate(VI).

The method of making the Ni/Mo hydrodesulfurization catalyst involves mixing the activated carbon with the Ni(II) salt and the Mo(VI) salt in a solvent to form a mixture. In a preferred embodiment, the solvent comprises water. The water may be tap water, distilled water, bidistilled water, deionized water, deionized distilled water, reverse osmosis water, and/or some other water. In one embodiment, the water is bidistilled to eliminate trace metals. Preferably the water is distilled water. In certain embodiments, other solvents including, but not limited to, alcohols (e.g. methanol, ethanol, n-propanol, i-propanol, n-butanol), and acetone may be used in addition to or in lieu of water.

In one or more embodiments, the mixture further comprises a chelating agent. Exemplary chelating agents that may be used during the mixing step include, but are not limited to, ethylenediaminetetraacetic acid (EDTA), citric acid, N-hydroxy ethylenediaminetetraacetic acid, diammonium ethylenediaminetetraacetic acid, as well as oxalic acid, malic acid, sebacic acid, tartaric acid, glucose, amino acids such as glutamine and histidine, other triprotic acids such as isocitric acid, aconitic acid, nitriloacetic acid, and propane-1,2,3-tricarboxylic acid, other tetraprotic acids such as cyclohexanediaminetetraacetic acid, and ethyleneglycol-bis-(beta-aminoethylether)-N,N'-tetraacetic acid, diethylenetriaminepentaacetic acid, urea, thiourea, tris(2-aminoethyl) amine, triethylenetetraamine, tetraethylenepentaamine, and derivatives thereof. In a preferred embodiment, the chelating agent used herein is ethylenediaminetetraacetic acid, citric acid, or both. In a most preferred embodiment, ethylenediaminetetraacetic acid is used in the mixture as a chelating agent.

Prior to the mixing step, the aforementioned reagents (i.e. Ni(II) and Mo(VI) salts, and optionally the chelating agent) may be dissolved in the solvent separately to form respective solutions, which are then mixed with the activated carbon to form the mixture. In an alternative embodiment, the metal salts (i.e. Ni(II) and Mo(VI) salts) are dissolved in the solvent to form a first mixture, and a solution of the chelating agent is mixed with the first mixture and the activated carbon to form the mixture. The mixing may occur via stirring, shaking, swirling, sonicating, blending, or by otherwise agitating the mixture. In one embodiment, the mixture is stirred by a magnetic stirrer or an overhead stirrer. In another embodiment, the mixture is left to stand (i.e. not stirred). Preferably, the mixture is subjected to ultrasonication. The ultrasonication may be performed using an ultrasonic bath or an ultrasonic probe. In one embodiment, the mixture is ultrasonicated at a frequency of 20-100 kHz, preferably 30-80 kHz, preferably 40-50 kHz for a time period ranging from 0.1-6 hours, 0.25-4 hours, 0.5-3 hours, or 1-2 hours.

In a preferred embodiment, an atomic ratio of the nickel to the molybdenum in the aforementioned mixture is maintained in a range of 1:3 to 1:5, 1:4 to 2:9, or about 0.23:1. In a related embodiment, a molar ratio of the Ni(II) salt to the Mo(VI) salt is in a range of 1:5 to 2:1, 2:9 to 3:2, 1:4 to 1:1, or 1:3 to 1:2. However, in certain embodiments, the molar ratio of the nickel(II) salt to the Mo(VI) salt is less than 1:5 or greater than 2:1, depending on the chemical formula of the salts. For example, a molar ratio of the Ni(II) salt $Ni(OCOCH_3)_2$ to the Mo(VI) salt $(NH_4)_6Mo_7O_{24}$ may be about 1.38:1 for the preparation of a mixture comprising nickel and molybdenum at an atomic ration of 0.23:1. And a molar ratio of the Ni(II) salt $Ni(OCOCH_3)_2$ to the Mo(VI) salt $(NH_4)_2MoO_4$ may be about 0.23:1 for the preparation of a mixture comprising nickel and molybdenum at an atomic ration of 0.23:1. In one embodiment, the Mo(VI) salt may present at a concentration of 5-25 wt %, 8-20 wt %, 10-18 wt %, or 12-15 wt % relative to a total weight of the activated carbon.

The method also involves the step of drying the mixture to form the Ni/Mo hydrodesulfurization catalyst. In a preferred embodiment, the mixture is dried at a first temperature of 40-95° C., preferably 50-90° C., preferably 60-85° C., preferably 70-80° C. for 0.1-6 hours, 0.25-5 hours, 0.5-4 hour, or 1-2 hours, and subsequently at a second temperature of 100-150° C., preferably 105-140° C., preferably 108-120° C., or about 110° C. for 1-48 hours, 2-36 hours, 3-24 hours, 4-12 hours, or 6-8 hours. A Ni/Mo hydrodesulfurization catalyst may be formed during the drying processes and be separated (e.g. filtered off, centrifuged) from the aforementioned mixture. Alternatively, the mixture may be heated in a single stage. For example, the mixture may be dried at a temperature of 40-150° C., preferably 50-140° C., preferably 60-130° C., preferably 70-120° C., preferably 80-110° C. for 1-48 hours, 2-24 hours, 4-12 hours, or 6-8 hours. An external heat source, such as a water bath or an oil bath, an oven, or a heating mantle, may be employed to dry the mixture. Alternatively, the mixture may be air dried or dried in an oven.

The present method may optionally further involve the step of calcining (i.e. heating) the Ni/Mo hydrodesulfurization catalyst at a temperature of 160-500° C., 180-450° C., 200-400° C., 250-350° C., or 275-325° C. for 1-8 hours, 2-6 hours, 2.5-4 hours, or about 3 hours. In a preferred embodiment, when the calcination step is performed, the Ni/Mo hydrodesulfurization catalyst is calcined at a temperature below 250° C., preferably at a temperature of 160-220° C., more preferably at a temperature of about 200° C. Calcination can be carried out in air within shaft furnaces, rotary kilns, multiple hearth furnaces, and/or fluidized bed reactors. Also, in some embodiments, the dried mass may not be calcined via heating in air, but in oxygen-enriched air, an inert gas, or a vacuum. In at least one embodiment, the Ni/Mo hydrodesulfurization catalyst disclosed herein is prepared without a calcination step and used directly after the drying.

In one or more embodiments, the Ni/Mo hydrodesulfurization catalyst prepared by the method of the first aspect has nickel and molybdenum disposed on the activated carbon. As used herein, "disposed on" describes catalytic materials being deposited on or impregnated in a support material such that the support material is completely or partially filled throughout, saturated, permeated, and/or infused with the catalytic materials. The catalytic materials (i.e. nickel and molybdenum) may be affixed to the activated carbon in any reasonable manner, such as physisorption, chemisorption, or mixtures thereof. In a related embodiment, the Ni/Mo hydrodesulfurization catalyst of the present disclosure may have both nickel and molybdenum decorated on the surface of the activated carbon. In another related embodiment, the Ni/Mo hydrodesulfurization catalyst may have both nickel and molybdenum disposed on the surface and impregnated in the activated carbon. In preferred embodiments, the nickel and molybdenum are homogeneously dispersed in the activated carbon.

In one embodiment, greater than 10% of the surface area (i.e. surface and pore spaces) of the activated carbon is covered by the nickel and molybdenum, preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99% of the activated carbon is covered by the nickel and molybdenum.

Preferably, the Ni/Mo hydrodesulfurization catalyst has an activated carbon content in a range of 60-95%, preferably 65-90%, preferably 70-88%, preferably 75-85%, preferably 78-82% by weight relative to a total weight of the Ni/Mo hydrodesulfurization catalyst. However, in certain embodiments, the activated carbon may present in the Ni/Mo hydrodesulfurization catalyst at a concentration that is less than 60% or greater than 95% by weight relative to a total weight of the Ni/Mo hydrodesulfurization catalyst.

In one or more embodiments, the Ni/Mo hydrodesulfurization catalyst disclosed herein has a Mo content in a range of 4-20%, preferably 4.5-18%, preferably 5-15%, preferably 5.5-12%, preferably 6-10 wt %, preferably 6.5-9%, preferably 7-8%, or about 7.5% by weight relative to a total weight of the Ni/Mo hydrodesulfurization catalyst. However, in certain embodiments, the Ni/Mo hydrodesulfurization catalyst has a Mo content that is less than 4% or greater than 20% by weight relative to a total weight of the Ni/Mo hydrodesulfurization catalyst. Preferably, molybdenum is present in the Ni/Mo hydrodesulfurization catalyst in oxide forms (e.g. $MoO_2$, $MoO_3$). However, in certain embodiments, molybdenum may be present in other species such as metallic molybdenum and sulfide forms in the Ni/Mo hydrodesulfurization catalyst in addition to, or in lieu of molybdenum oxides.

In a preferred embodiment, the Ni/Mo hydrodesulfurization catalyst has a Ni:Mo molar ratio ranging from 1:10 to 1:2, from 1:9 to 2:3, from 1:8 to 1:1, from 1:7 to 2:3, from 1:6 to 1:2, from 1:5 to 1:3, or from 1:4 to 2:7. However, in certain embodiments, the Ni/Mo hydrodesulfurization catalyst has a Ni:Mo molar ratio that is less than 1:10 or greater than 1:2. Preferably, nickel is present in the Ni/Mo hydrodesulfurization catalyst in oxide forms (e.g. NiO, $Ni_2O_3$). However, in certain embodiments, nickel may be present in other species such as metallic nickel and sulfide forms in the Ni/Mo hydrodesulfurization catalyst in addition to, or in lieu of nickel oxides.

The Ni/Mo hydrodesulfurization catalyst disclosed herein may be in the form of particles having spherical or substantially spherical shape (e.g., oval or oblong shape). In some embodiments, the Ni/Mo hydrodesulfurization catalyst is in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface). In one or more embodiments, the Ni/Mo hydrodesulfurization catalyst has a BET surface area of 250-500 $m^2/g$, 275-475 $m^2/g$, 300-450 $m^2/g$, 325-425 $m^2/g$, 350-400 $m^2/g$, or 365-380 $m^2/g$. Preferably, the Ni/Mo hydrodesulfurization catalyst is mesoporous. In a related embodiment, the Ni/Mo hydrodesulfurization catalyst has an average pore diameter of 4-10 nm, 4.5-9.5 nm, 5-9 nm, 5.5-8.5 nm, 6-8 nm, or 6.5-7 nm. In another related embodiment, the Ni/Mo hydrodesulfurization catalyst has a pore volume of 0.2-3 $cm^3/g$, 0.3-2.8 $cm^3/g$, 0.4-2.5 $cm^3/g$, 0.5-2.2 $cm^3/g$, 0.6-2 $cm^3/g$, 0.7-1.8 $cm^3/g$, 0.8-1.5 $cm^3/g$, or 0.9-1.2 $cm^3/g$.

According to a second aspect, the present disclosure relates to a method for desulfurizing a hydrocarbon feedstock comprising a sulfur-containing compound. The method involves contacting the hydrocarbon feedstock with a Ni/Mo hydrodesulfurization catalyst that has nickel and molybdenum disposed on an activated carbon, in the presence of $H_2$ gas to convert at least a portion of the sulfur-containing compound into a mixture of $H_2S$ and a desulfurized product, and removing the $H_2S$ from the mixture, thereby forming a desulfurized hydrocarbon stream. The Ni/Mo hydrodesulfurization catalyst used herein may have similar properties as described for that in the first aspect, such as composition, surface area, pore size, pore volume, and/or some other property. The Ni/Mo hydrodesulfurization catalyst with similar properties may be formed by following the aforementioned reaction conditions, such as reagents, solvent, reaction time, and/or temperature.

Preferably, the Ni/Mo hydrodesulfurization catalyst used herein has an activated carbon content in a range of 60-95%, preferably 65-90%, preferably 70-88%, preferably 75-85%, preferably 78-82% by weight relative to a total weight of the Ni/Mo hydrodesulfurization catalyst. Preferably, the Ni/Mo hydrodesulfurization catalyst used herein has a Mo content in a range of 4-20%, preferably 4.5-18%, preferably 5-15%, preferably 5.5-12%, preferably 6-10 wt %, preferably 6.5-9%, preferably 7-8%, or about 7.5% by weight relative to a total weight of the Ni/Mo hydrodesulfurization catalyst. Preferably, the Ni/Mo hydrodesulfurization catalyst has a Ni:Mo molar ratio ranging from 1:10 to 1:2, from 1:9 to 2:3, from 1:8 to 1:1, from 1:7 to 2:3, from 1:6 to 1:2, from 1:5 to 1:3, or from 1:4 to 2:7. Preferably, the Ni/Mo hydrodesulfurization catalyst used herein has a BET surface area of 250-500 $m^2/g$, 275-475 $m^2/g$, 300-450 $m^2/g$, 325-425 $m^2/g$, 350-400 $m^2/g$, or 365-380 $m^2/g$. Preferably, the Ni/Mo hydrodesulfurization catalyst is mesoporous and has an average pore diameter of 4-10 nm, 4.5-9.5 nm, 5-9 nm, 5.5-8.5 nm, 6-8 nm, or 6.5-7 nm. Preferably, the Ni/Mo hydrodesulfurization catalyst used herein has a pore volume of 0.2-3 $cm^3/g$, 0.3-2.8 $cm^3/g$, 0.4-2.5 $cm^3/g$, 0.5-2.2 $cm^3/g$, 0.6-2 $cm^3/g$, 0.7-1.8 $cm^3/g$, 0.8-1.5 $cm^3/g$, or 0.9-1.2 $cm^3/g$.

The hydrocarbon feedstock may be delivered from a hydrocarbon reservoir or directly from an offshore or an onshore well. For example, the hydrocarbon feedstock may be a crude oil that is produced from an oil well, particularly from a sour gas oil well. Alternatively, the hydrocarbon feedstock may be a gaseous stream that is supplied directly from an offshore or an onshore well, or a sulfur-containing liquid or gaseous stream, e.g. gaseous ethane, liquid gasoline, liquid naphtha, etc. in a refinery or a petrochemical plant that needs to be desulfurized.

The hydrocarbon feedstock including a sulfur-containing compound may also include various hydrocarbon compounds such as $C_{1-50}$ hydrocarbon compounds, preferably $C_{2-30}$ hydrocarbon compounds, preferably $C_{3-20}$ hydrocarbon compounds, depending on the origin of the hydrocarbon feedstock. In one embodiment, the hydrocarbon feedstock includes $C_{1-20}$ normal paraffins, e.g. $C_{1-20}$ alkanes, $C_{1-20}$ isoparaffins, $C_{1-20}$ cycloparaffins (i.e. naphthenes) or $C_{1-20}$ cycloparaffins having side chain alkyl groups, $C_{1-20}$ aromatics or $C_{1-20}$ aromatics with side chain alkyl groups.

Exemplary sulfur-containing compounds include, but are not limited to, $H_2S$, elemental sulfur, carbon disulfide, dimethyl disulfide, ethyl disulfide, propyl disulfide, isopropyl disulfide, butyl disulfide, tertiary butyl disulfide, thianaphthene, thiophene, secondary dibutyl disulfide, thiols, methyl mercaptan, phenyl mercaptan, cyclohexythiol, methyl sulfide, ethyl sulfide, propyl sulfide, isopropyl sulfide, butyl sulfide, secondary dibutyl sulfide, tertiary butyl sulfide, benzothiophene, dibenzothiophene, alkyl benzothiophene, alkyl dibenzothiophene, thiocyclohexane, and/or any combination thereof.

In one or more embodiments, the sulfur-containing compound is at least one selected from the group consisting of a sulfide, a disulfide, a thiophene, a benzothiophene, and a dibenzothiophene. In a preferred embodiment, the sulfur-containing compound is a dibenzothiophene. Exemplary dibenzothiophenes include, but are not limited to, dibenzothiophene, 4-methyldibenzothiophene, 4,6-dimethyldibenzothiophene, and 4,6-diethyldibenzothiophene.

In one or more embodiments, the sulfur-containing compound may be present in the hydrocarbon feedstock at a concentration of 0.01-10%, preferably at least 0.05%, at least 0.1%, at least 1%, at least 3%, at least 5%, at least 6%, at least 7%, at least 8%, at least 9% by weight, and no more than 10% by weight, relative to a total weight of the hydrocarbon feedstock. In a related embodiment, a concentration of the sulfur-containing compound in the hydrocarbon feedstock is no more than 50,000 ppm, preferably no more than 20,000 ppm, preferably no more than 10,000 ppm, preferably no more than 5,000 ppm, preferably no more than 4,000 ppm, preferably no more than 2,000 ppm. In an alternative embodiment, a concentration of sulfur-containing compound in the hydrocarbon feedstock is in the range of 100 to 10,000 ppm, preferably 250 to 7,500 ppm, preferably 500 to 5,000 ppm, preferably 750 to 2,500 ppm, preferably 1,000 to 2,000 ppm.

The hydrocarbon feedstock may be contacted with the Ni/Mo hydrodesulfurization catalyst in the presence of $H_2$ gas under favorable reaction conditions to convert at least a portion of the sulfur-containing compound into a mixture of $H_2S$ and a desulfurized product. In a preferred embodiment, the hydrocarbon feedstock is contacted with the Ni/Mo hydrodesulfurization catalyst at a temperature in a range of 150 to 500° C., preferably 200-450° C., preferably 300-400° C., or about 350° C. for 0.1-10 hours, 0.5-8 hours, 1-6 hours, 2-5 hours, or 3-4 hours. In one or more embodiments, a pressure of the $H_2$ gas is in a range of 2 to 10 MPa, preferably 3 to 9 MPa, preferably 3.5-8 MPa, preferably 4-7 MPa, preferably 4.5-6 MPa, or about 5 MPa. A volumetric flow ratio of the $H_2$ gas to the hydrocarbon feedstock may vary depending on the type of sulfur-containing compound present in the hydrocarbon feedstock. In some embodiments, the volumetric flow ratio of the $H_2$ gas to the hydrocarbon feedstock is in a range of 100:1 to 1:100, preferably 80:1 to 1:80, preferably 50:1 to 1:50, preferably 40:1 to 1:40, preferably 30:1 to 1:30.

The hydrocarbon feedstock may be in a liquid state or a gaseous state. In view of that, contacting the hydrocarbon feedstock with the Ni/Mo hydrodesulfurization catalyst may be different, depending on the state of the hydrocarbon feedstock, i.e. the liquid state or the gaseous state. In one embodiment, the hydrocarbon feedstock is in a liquid state or in a gaseous state and the hydrocarbon feedstock is passed through the Ni/Mo hydrodesulfurization catalyst via a fixed-bed or a fluidized-bed reactor. In another embodiment, the hydrocarbon feedstock is in a gaseous state and the hydrocarbon feedstock is passed over the Ni/Mo hydrodesulfurization catalyst, or may stay stagnant over the Ni/Mo hydrodesulfurization catalyst, i.e. as an atmosphere to the catalyst. Yet in another embodiment, the hydrocarbon feedstock is in a liquid state and the hydrocarbon feedstock is mixed with the Ni/Mo hydrodesulfurization catalyst to form a heterogeneous mixture in a batch reactor equipped with a rotary agitator.

In one embodiment, the contacting converts by weight 20-99.8%, preferably at least 25%, preferably at least 30%, preferably at least 40%, preferably at least 50%, preferably at least 60%, preferably at least 70%, preferably at least 80%, preferably at least 90%, preferably at least 95%, preferably at least 99% of the sulfur-containing compound present in the hydrocarbon feedstock into a mixture of $H_2S$ and a desulfurized product. The method disclosed herein may include removing the $H_2S$ from the mixture in the presence of a nitrogen stream to form a desulfurized hydrocarbon stream. "Removing", as used herein, may refer to any process of separating, at least one component from a mixture. Exemplary removing processes include, but are not limited to, distillation, absorption, adsorption, solvent extraction, stripping, and filtration and are well known to those skilled in the art. The removed $H_2S$ may be collected and further supplied to a sulfur manufacturing plant to produce sulfur-containing products.

In one or more embodiments, the sulfur content of the desulfurized hydrocarbon stream is by weight 20-99.8%, preferably at least 25%, preferably at least 30%, preferably at least 40%, preferably at least 50%, preferably at least 60%, preferably at least 70%, preferably at least 80%, preferably at least 90%, preferably at least 95%, preferably at least 99% less than that of the hydrocarbon feedstock prior to the contacting.

As used herein, the term "$k_{HDS}$" refers to a rate constant of desulfurization reactions catalyzed by the Ni/Mo hydrodesulfurization catalyst.

Traditionally, metal doping is often used to improve performance of hydrodesulfurization catalysts. However, the presently disclosed Ni/Mo hydrodesulfurization catalyst that is supported by the aforementioned activated carbon demonstrates greater catalytic activity than a Ni/Mo hydrodesulfurization catalyst that is supported by a metal-containing catalyst support (e.g. $TiO_2$, activated carbon-$TiO_2$ composite). In one embodiment, the rate constant of desulfurization reactions catalyzed by the Ni/Mo hydrodesulfurization catalyst that is supported by the aforementioned activated carbon is at least 15% greater than that of a Ni/Mo hydrodesulfurization catalyst that is supported by a metal-containing catalyst support (e.g. $TiO_2$, activated carbon-$TiO_2$ composite), preferably at least 20%, preferably at least 25%, preferably at least 30%, preferably at least 35%, preferably at least 40%, preferably at least 45%, preferably at least 50%, preferably at least 55%, preferably at least 60% greater than that of a Ni/Mo hydrodesulfurization catalyst that is supported by a metal-containing catalyst support (e.g. $TiO_2$, activated carbon-$TiO_2$ composite) (see Table 7).

It is worth noting that the presently disclosed Ni/Mo hydrodesulfurization catalysts that are not calcined or calcined at a low temperature (e.g. 200° C.) demonstrate greater catalytic activity than those calcined at a high temperature (e.g. 300° C., 400° C.). In one embodiment, the rate constant of desulfurization reactions catalyzed by the Ni/Mo hydrodesulfurization catalysts that are not calcined or calcined at a low temperature (e.g. 200° C.) is at least 50% greater than those calcined at a high temperature (e.g. 300° C., 400° C.), preferably at least 52%, preferably at least 54%, preferably at least 56%, preferably at least 58%, preferably at least 60%, preferably at least 62%, preferably at least 64%, preferably at least 66%, preferably at least 68% greater than those calcined at a high temperature (e.g. 300° C., 400° C.) (see Table 9).

In another embodiment, the rate constant of desulfurization reactions catalyzed by the Ni/Mo hydrodesulfurization catalyst that is prepared using a complexing agent (e.g. EDTA, citric acid) is at least 12% greater than that of a Ni/Mo hydrodesulfurization catalyst not produced using the complexing agent, preferably at least 15%, preferably at least 20%, preferably at least 25%, preferably at least 30%, preferably at least 35%, preferably at least 40%, preferably at least 45%, preferably at least 50%, preferably at least 55%, preferably at least 60%, preferably at least 65% greater than that of a Ni/Mo hydrodesulfurization catalyst not produced using the complexing agent (see Tables 9 and 11).

Prior to contacting with the hydrocarbon feedstock, the Ni/Mo hydrodesulfurization catalyst may be treated with a mixture comprising $H_2$ gas. Preferably, the Ni/Mo hydrodesulfurization catalyst is treated with the mixture comprising $H_2$ gas at a temperature in a range of 250 to 500° C., preferably 300-450° C., preferably 350-425° C., or about 400° C. for 0.5 to 6 hours, preferably 1-4 hours, preferably 1.5-3 hours, or about 2 hours to form a reduced Ni/Mo hydrodesulfurization catalyst. In one embodiment, the mixture is passed through the Ni/Mo hydrodesulfurization catalyst, wherein the mixture contains 2 to 10 vol %, preferably 4 to 6 vol %, or about 5 vol % of $H_2$ gas diluted in nitrogen, helium, and/or argon, with the volume percent being relative to a total volume of the mixture.

The reduced Ni/Mo hydrodesulfurization catalyst may be presulfided prior to being contacted with the hydrocarbon feedstock. Preferably, the reduced Ni/Mo hydrodesulfurization is presulfided with a sulfide-containing solution at a temperature in a range of 250 to 450° C., preferably 300 to 400° C., or about 350° C. The sulfide-containing solution used herein may include carbon disulfide ($CS_2$), and may further include dimethyl disulfide, ethylene sulfide, trimethylene sulfide, propylene sulfide, and bis(methylthio)methane. This step may convert active catalyst materials in oxide form to their corresponding sulfide form, which may be catalytically more active than the oxide form.

The examples below are intended to further illustrate protocols for preparing, characterizing the Ni/Mo hydrodesulfurization catalyst, and uses thereof, and are not intended to limit the scope of the claims.

Example 1

Materials

Activated carbon (AC) derived from waste tires, ammonium molybdate [$(NH_4)_6Mo_7O_{24} \cdot 4H_2O$], nickel acetate [Ni$(C_2H_3O_2)_2 \cdot 4$ $H_2O$], cobalt nitrate [$Co(NO_3)_2 \cdot 6$ $H_2O$], decahydronaphthalene (decalin) [$C_{10}H_{18}$], dibenzothiophene (DBT) [$C_{12}H_8S$], citric acid (CA) [$C_6H_{10}O_7$], ethylenediaminetetracetic acid (EDTA) [$C_{10}H_{16}N_2O_8$], and deionized water [$H_2O$].

The ammonium molybdate, nickel acetate, and cobalt nitrate were A.C.S certified analytical grades from Fisher Scientific Company, USA. Decalin (99%) and DBT (98%) were obtained from Sigma Aldrich. All the reagents were used as purchased from the manufacturers without any form of pretreatment or modification.

Example 2

Preparation of Support Materials: Preparation of Activated Carbon Support

Activated carbon support was prepared from waste rubber tires according to the detailed procedure described in a previous report [V. K. Gupta, I. Ali, T. A. Saleh, M. N. Siddiqui, and S. Agarwal, "Chromium removal from water by activated carbon developed from waste rubber tires," Environ. Sci. Pollut. Res., vol. 20, no. 3, pp. 1261-1268, 2013, incorporated herein by reference in its entirety].

Example 3

Preparation of Support Materials: Preparation of $TiO_2$ Support $TiO_2$ was prepared through a modified sol-gel and hydrothermal synthesis route reported in the literature. A dilute aqueous solution of $TiCl_4$ was prepared by adding 20 mL of $TiCl_4$ to 40 mL ethanol kept in an ice bath. The calculated amount of deionized water was added to the solution to form a 2 molar stock of $TiCl_4$. Appropriate amounts of the solution were added to a round bottom flask, which was then placed in an oil bath sitting on a hot plate/magnetic stirrer. Drops of diluted aqueous ammonia were added to the solutions until a gel was formed while stirring at a solution was stirred at 350 rpm and the temperature was set at 80° C. The gel was allowed to age for 24 h before filtration and washing with distilled water to remove the excess base. The material was filtered and allowed to dry in an oven.

Example 4

Preparation of Support Materials: Preparation of Carbon-$TiO_2$ Composite Support 6 g of activated carbon was added to 80 mL of deionized water and stirred for 1 h. The mixture was transferred to a round bottom flask containing 20 mL of the $TiCl_4$ prepared previously. Then diluted aqueous ammonia was added dropwise to the solutions until a gel was formed while the solution was stirred at 350 rpm and the temperature was set at 80° C. The gel was allowed to age for 24 h before filtration and washing with distilled water to remove the excess base. The material was filtered and allowed to dry in an oven.

Example 5

Preparation of HDS Catalysts: NiMo/AC, NiMo/$TiO_2$, and NiMo/AC-$TiO_2$

NiMo/AC was prepared through co-impregnation of the activated carbon with Ni and Mo using aqueous solutions each containing an appropriate amount of the metallic salts. 6 g of the activated carbon was added to aqueous solutions containing calculated amounts of the metal salts and subjected to continuous stirring for 2 hrs. Nickel acetate and ammonium heptamolybdate were used as the precursors to prepare a set of solutions containing 13 wt % Mo with the atomic ratio of Ni/Mo maintained at 0.23 for all samples. Afterwards, stirring was stopped and the solution was allowed to evaporate at 70° C. and then dried at 120° C. for 24 h. Both NiMo/$TiO_2$ and NiMo/AC-$TiO_2$ were prepared in a similar fashion as NiMo/Ac using $TiO_2$ and AC-$TiO_2$ as the support, respectively. The dried materials were subjected to further calcination at 300° C. for 3 hrs and labeled accordingly.

Example 6

Preparation of HDS Catalysts: Mo/AC, NiMo/AC, and CoMo/AC

Mo/AC was prepared through impregnation of the activated carbon with Mo using an aqueous solution of the salt containing 13 wt % of the metal. NiMo/AC and CoMo/AC were prepared through the co-impregnation of the activated carbon with Mo and Ni, and Mo and Co, respectively, as indicated by the labels. The atomic ratios of Ni/Mo and Co/Mo, were 0.23 for both NiMo/AC and CoMo/AC, while the total metal loading was maintained at 13 wt %. at Mo using aqueous solutions containing the appropriate amounts of their metallic salts. In all cases, 6 g of the activated carbon was added to aqueous solutions containing calculated amounts of the metal salts which were subjected to continuous stirring for 2 hrs. Afterwards, the stirring was stopped and the solution was allowed to evaporate at 70° C. and then dried at 120° C. for 24 h. Some of the dried materials were subjected to further calcination at 300° C. for 3 hrs and were labeled according to the materials' composition.

Example 7

Preparation of HDS Catalysts: NiMo/AC, NiMo/AC 200, NiMo/AC300, and NiMo/AC400

NiMo/AC was prepared through the co-impregnation of activated carbon support with Ni and Mo as using aqueous solutions containing the appropriate amounts of the metal salts. 6 g of the activated carbon was added to aqueous solutions containing calculated amounts of the metal salts which were subjected to continuous stirring for 2 hrs prior to evaporation at 70° C. and subsequent drying at 110° C. NiMo/AC 200, NiMo/AC300 and NiMo/AC400 were prepared in a similar way as NiMo/AC but the catalysts were subjected to calcination for 3 h at different temperatures after the drying at 110° C. NiMo/AC 200, NiMo/AC300, and NiMo/AC400 were calcined at 200° C., 300° C., and 400° C., respectively. The catalysts were labeled such that the figures reflect the calcination temperature and the composition of each prepared catalysts.

Example 8

Preparation of HDS Catalysts: NiMo/AC, NiMo/AC(US), NiMo/AC(CA), and NiMo/AC(EDTA)

NiMo/AC was prepared through the co-impregnation of activated carbon support with Ni and Mo as using aqueous solutions containing the appropriate amounts of their metal salts. 6 g of the activated carbon was added to aqueous solutions containing calculated amounts of the metal salts which were subjected to continuous stirring for 2 hrs prior to evaporation at 70° C. and subsequent drying at 110° C. As for NiMo/AC(US), 30 min. ultrasonication was used to facilitate the dispersion of the active metals during the impregnation. In the case of NiMo/AC(CA) and NiMo/AC (EDTA), chelating agents citric acid and ethylenediaminetetracetic acid (EDTA), were used respectively to facilitate the dispersion of the active phase. In all cases, 6 g of the support was used and the metal loading was maintained at 13 wt %. The impregnation mixture was allowed to evaporate at 70° C. and then dried at 120° C. for 24 h. The dried materials were subjected to calcination at 300° C. for 3 h and then labeled using the initials of the dispersion medium.

Example 9

Characterization of Support Materials and Catalysts
(i) TGA
Dried catalysts without calcination were used for the TGA analysis and all experiments were conducted using a Mettler-Toledo TGA/SDTA 851$^e$, under static air atmosphere and a heating rate of 10° C./min from 40 to 1000° C.
(ii) FT-IR
Fourier transform infrared spectroscopy (FT-IR) was used to identify various functional groups present on the bare support and the catalysts supported on the active carbon using a Nicolet 6700 spectrometer (Thermo Electron). Pellets of the samples were made by adding KBr as a binder and the absorption spectra were obtained with 64 scans.
(iii) XRD
Powder X-ray diffraction (XRD) of the passivated sample was performed on a Bruker D8 focus diffractometer, with Cu Kα radiation at 40 kV and 40 mA. Powder diffractograms were recorded at a scanning speed of 12° min$^{-1}$ over a 2θ range of 10-80°.
(iv) Textural Properties
$N_2$ adsorption-desorption isotherms were obtained for the bare activated carbon and then the supported catalysts after calcination at 300° C. under $N_2$ temperature. BET surface areas, pore volumes, and pore size distributions were measured under a liquid nitrogen atmosphere (−196° C.) using a micromeritics ASAP 2020 automatic analyzer. All samples were degassed at 150° C. for 3 h and then allowed to cool before the experiments.
(v) SEM-EDX
Scanning Electron Microscope JEOL-JSM6610LV was used to examine the morphology of the samples using secondary electron (SE) and backscattered electron (BSE) mode at an accelerating voltage of 20 kV, and the attached energy dispersive X-ray spectrometer (EDS, Oxford Inc.) detector was employed for subsequent elemental composition analysis and element mapping of the samples.

Example 10

Catalysts Activity Tests
The catalytic activity of the prepared materials towards HDS of DBT was evaluated in a high-pressure batch reactor (model: Parr 4576B) at 350° C. under 5 MPa of $H_2$ pressure and a constant 300 rpm stirring. 0.3 g of each catalyst was used for reactions conducted using 100 mL of DBT fuel model. Decalin (decahydronaphthalene) was used as a solvent for the preparation of the model fuel containing 1000 ppm S (0.588 g of DBT). The catalytic activity tests lasted 4 h after the reactor temperature reached the set point of 350° C. and aliquots of the product were taken from the reactor at an interval of one hour. Prior to the tests, each catalysts was pre-sulfided using a solution containing 2 wt. % $CS_2$ in a quartz tube at 350° C. for 5 h after reduction with of 5% $H_2$/He (60 mL/min) at 400° C. for 2 h.

Example 11

Textural Properties of Support Materials and Catalysts
Textural properties of the support materials are presented in Table 1. Analysis of the results shows that AC has the largest BET surface area of 583 m$^2$/g compared to 354 m$^2$/g and 310 m$^2$/g recorded for $TiO_2$ and AC-$TiO_2$, respectively. A similar trend is observed for the external surface area and micropore area of the three support materials. Although $TiO_2$ has a larger BET surface area and external surface area than AC-$TiO_2$, it is important to note that the micropore area of $TiO_2$ is exceptionally small when compared to the micropore areas of AC and AC-$TiO_2$, which is a composite of AC and $TiO_2$. The observations above indicate that AC, $TiO_2$, and AC-$TiO_2$ have unique surface and textural properties. Moreover, the total pore volumes as well as the average pore diameter of the three support materials are different. While the total pore volumes recorded for AC, $TiO_2$ and AC-$TiO_2$ were 0.97, 0.26, and 0.43 cm$^3$/g, the average pore diameters were approximately 52, 20, and 55 Å (55.22, 3.0 and 5.5 nm), respectively.

TABLE 1

Textural Properties of Catalysts'
Support Materials: AC, $TiO_2$, and AC-$TiO_2$

| Catalysts' supports | BET Surface Area (m$^2$/g) | External Surface Area (m$^2$/g) | Micropore Area (m$^2$/g) | Total pore volume of pores (cm$^3$/g) | Average pore diameter (Å) |
|---|---|---|---|---|---|
| AC | 583.3670 | 350.1640 | 233.2031 | 0.979245 | 52.3220 |
| $TiO_2$ | 354.4782 | 349.9376 | 4.5405 | 0.263163 | 29.6959 |
| AC-$TiO_2$ | 310.5169 | 219.1774 | 91.3395 | 0.432088 | 55.6604 |

Figure 1:
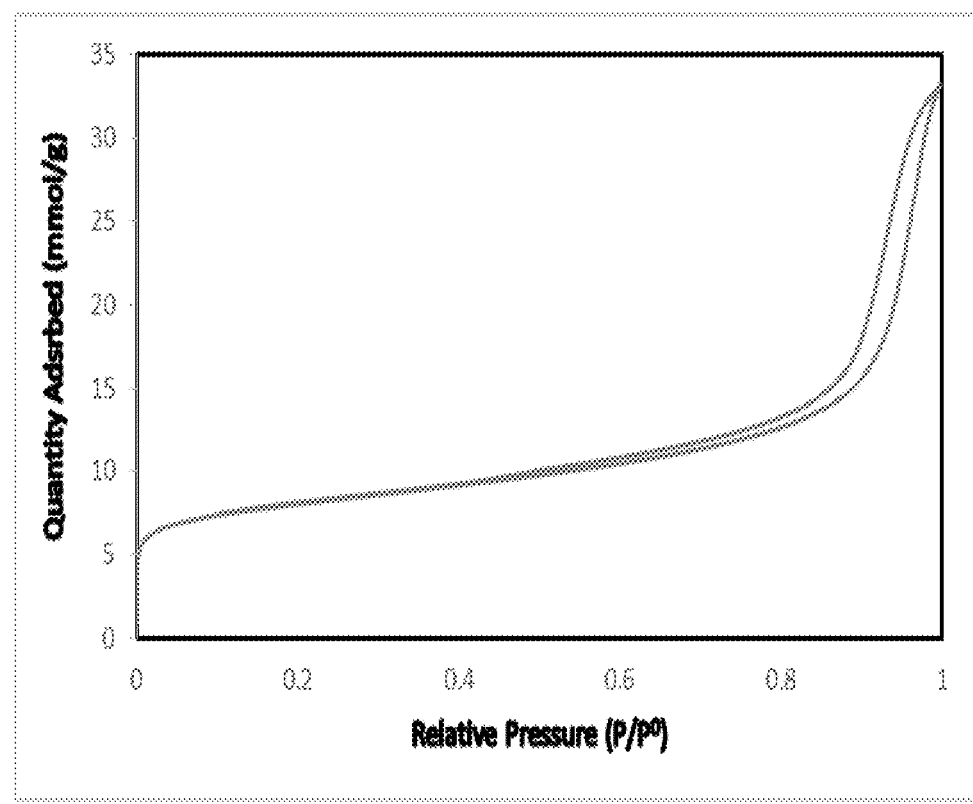
FIG. 1 represents N$_2$ adsorption-desorption isotherms of activated carbon.
Figure 2:
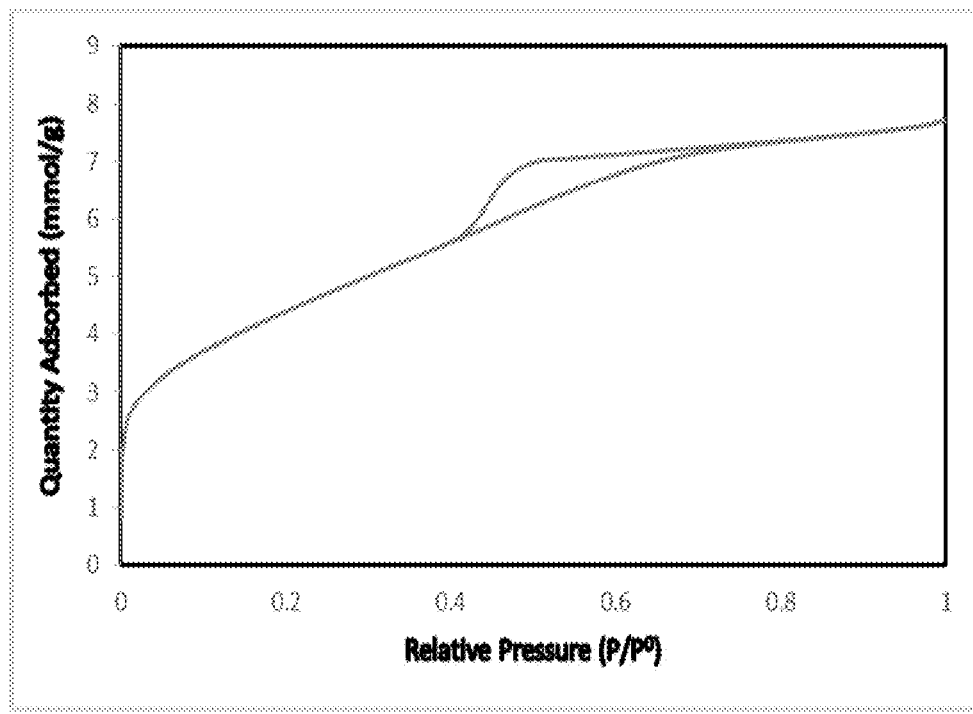
FIG. 2 represents N$_2$ adsorption-desorption isotherms of TiO$_2$.
Figure 3:
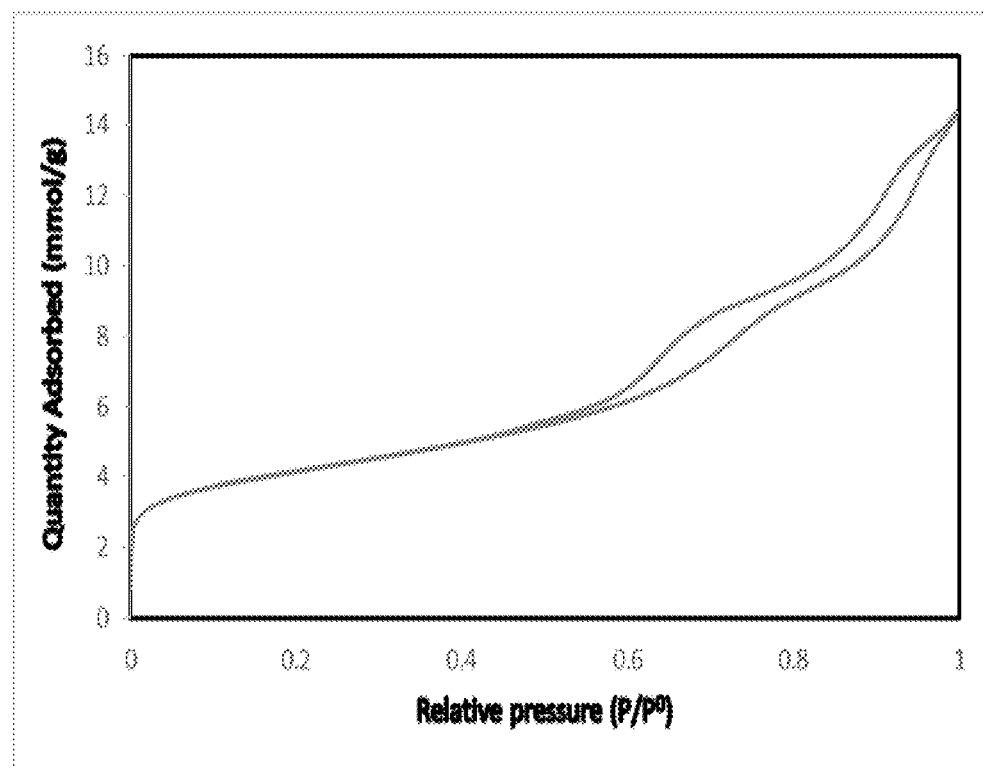
FIG. 3 represents N$_2$ adsorption-desorption isotherms of activated carbon-TiO$_2$ composite.

The average pore diameters of the three catalysts indicate that all the support materials are mesoporous, since the values are all greater than 2 nm and less than 50 nm [C. Liang, Z. Li, and S. Dai, "Mesoporous carbon materials: synthesis and modification.," Angew. Chem. Int. Ed. Engl., vol. 47, no. 20, pp. 3696-717, 2008; and W. Li, J. Liu, and D. Zhao, "Mesoporous materials for energy conversion and storage devices," Nat. Rev. Mater., vol. 1, no. 6, p. 16023, 2016, each incorporated herein by reference in their entirety]. Moreover, $N_2$ adsorption-desorption isotherms of all the prepared support materials are similar to the type-IV isotherm exhibited by mesoporous materials. The $N_2$ adsorption-desorption isotherms for AC, $TiO_2$, and AC-$TiO_2$ are presented in FIGS. 1, 2, and 3, respectively. The shapes of isotherm for AC and $TiO_2$ are similar but there is a slight distortion in the case of AC-$TiO_2$, different in the amount of $N_2$ adsorbed in each case. The observed distortion in the shape of AC-$TiO_2N_2$ adsorption-desorption isotherm could be considered as a reflection of the composite nature of the support material comprising both AC and $TiO_2$.

Textural properties of the catalysts supported on AC, $TiO_2$, and AC-$TiO_2$ are presented in Table 2. Analysis of the results shows that the textural properties of the support have impact on loading the supports with equivalent amounts of metal catalyst. A reduction in the BET surface, external surface area, and micropore area of the support materials can be observed when comparing the values in Table 2 and Table 3. For example, the BET surface of AC is reduced from 583 m$^2$/g to 352 m$^2$/g upon loading the Ni and Mo metal species onto the support material to form the corresponding NiMo/AC catalyst. A similar trend of reduction in BET surface area is observed when comparing $TiO_2$ and AC-$TiO_2$ to corresponding catalysts NiMo/$TiO_2$ and NiMo/AC-$TiO_2$, respectively. The observed reduction in the BET surface area, external surface area, micropore area, and the total pore volume of the of the support materials, when compared to the corresponding HDS catalysts, is an indication of the successful incorporation of the metal catalysts onto the support materials.

TABLE 2

Textural Properties of Catalysts: NiMo/AC, NiMo/TiO$_2$, and NiMo/AC-TiO$_2$

| Catalysts | BET Surface Area (m$^2$/g) | External Surface Area (m$^2$/g) | Micropore Area (m$^2$/g) | Total pore volume of pores (cm$^3$/g) | Average pore diameter (Å) |
|---|---|---|---|---|---|
| NiMo/AC | 352.1114 | 230.7778 | 121.3336 | 0.530329 | 60.2456 |
| NiMo/TiO$_2$ | 225.82 | 220.98 | 2.633 | 0.3218 | 31.751 |
| NiMo/AC-TiO$_2$ | 220.8506 | 170.6991 | 50.1515 | 0.475779 | 86.1721 |

Figure 4:
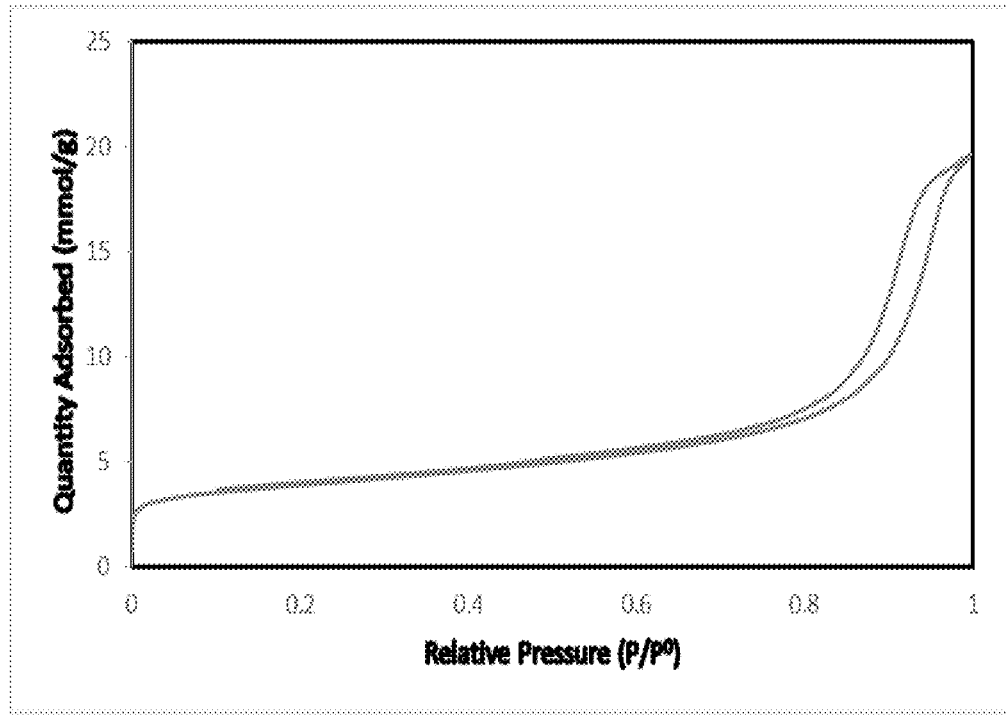
FIG. 4 represents N$_2$ adsorption-desorption isotherms of an activated carbon supported Ni/Mo catalyst.
Figure 5:
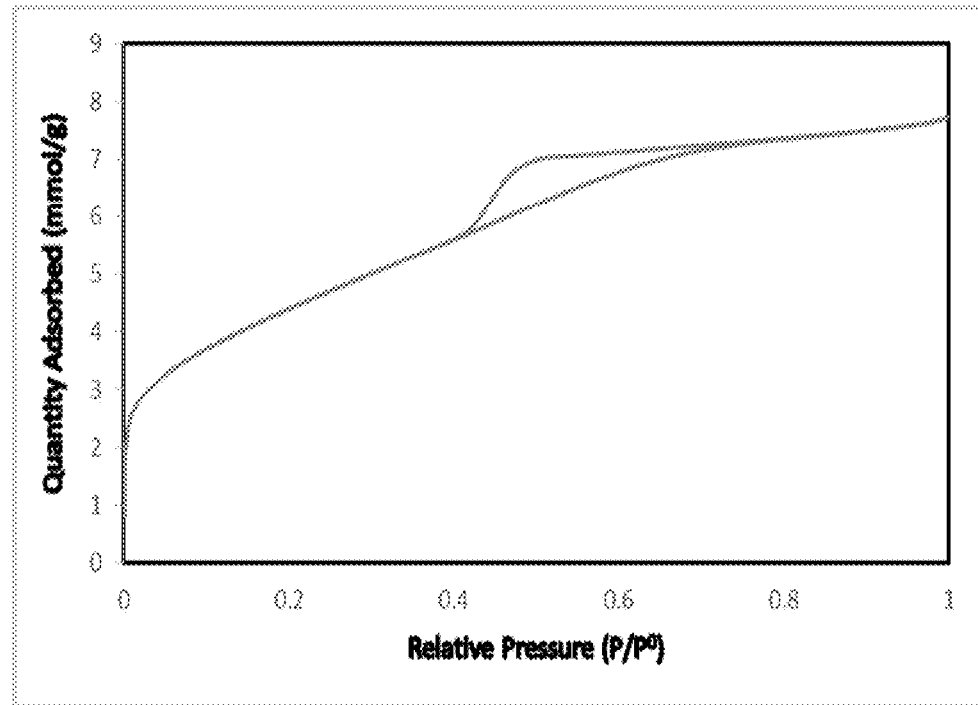
FIG. 5 represents N$_2$ adsorption-desorption isotherms of a TiO$_2$ supported Ni/Mo catalyst.
Figure 6:
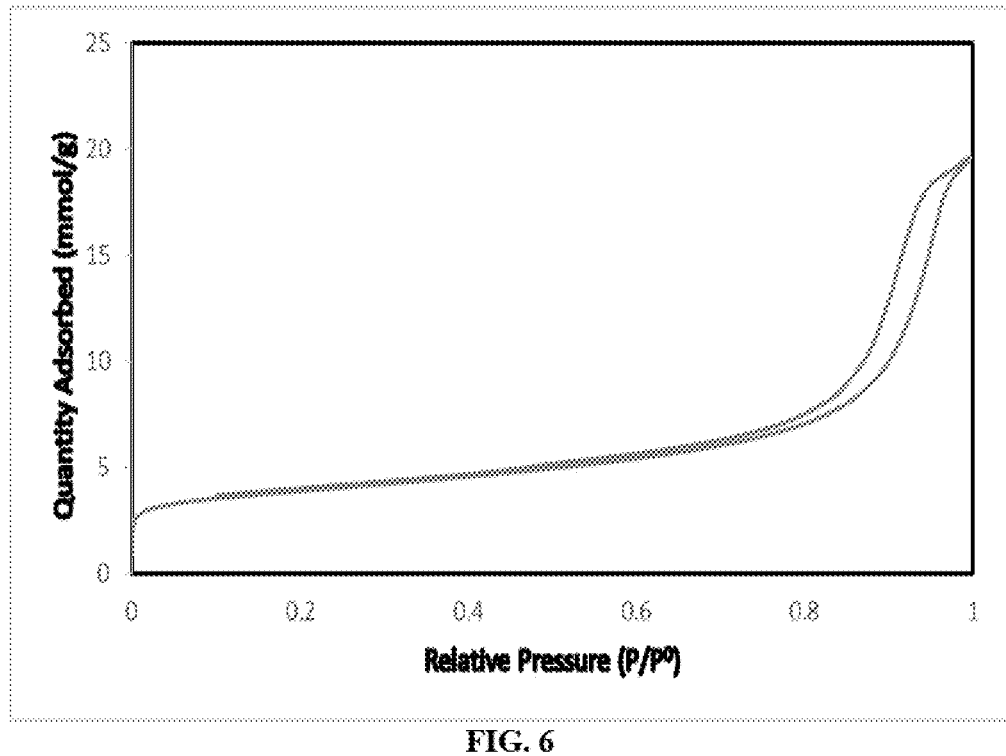
FIG. 6 represents N$_2$ adsorption-desorption isotherms of an activated carbon-TiO$_2$ composite supported Ni/Mo catalyst.
Figure 7:
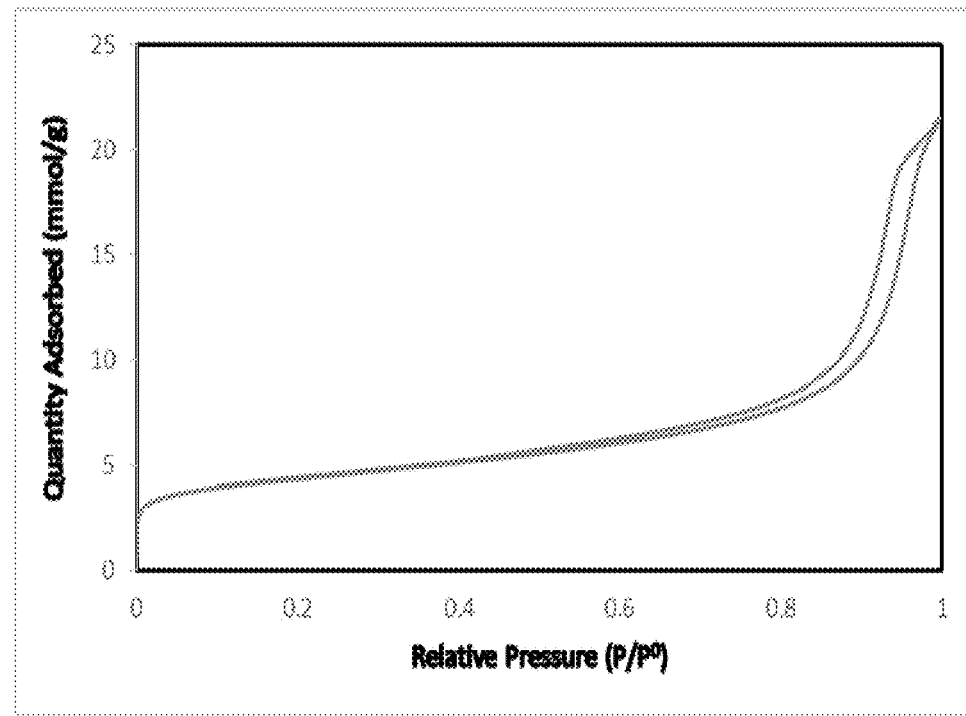
FIG. 7 represents N$_2$ adsorption-desorption isotherms of an activated carbon supported Ni/Mo catalyst calcined at 100° C.
Figure 8:
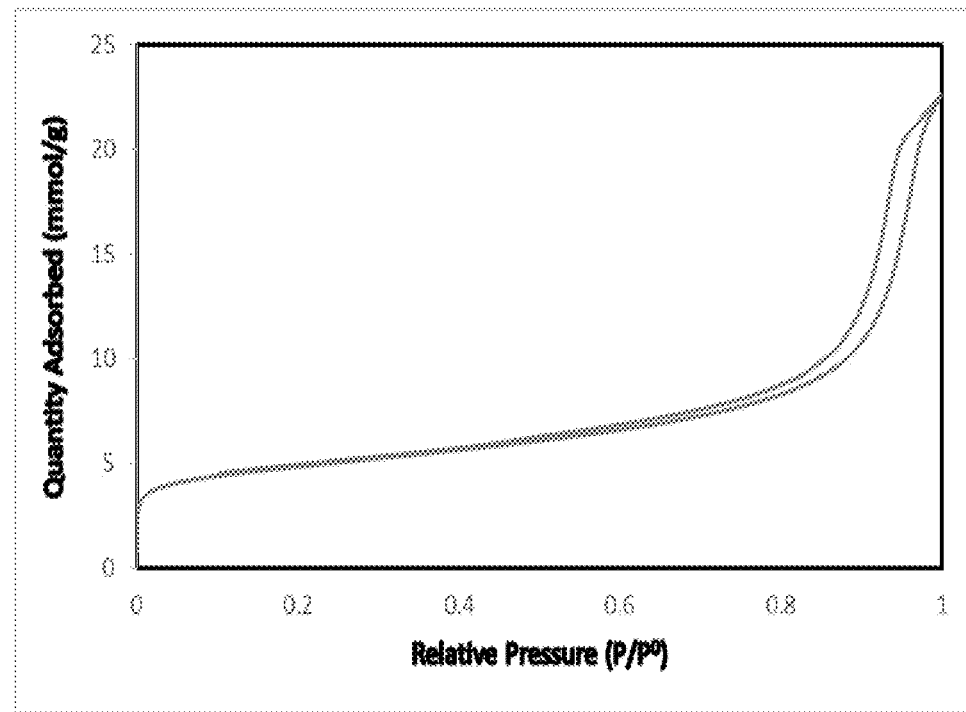
FIG. 8 represents N$_2$ adsorption-desorption isotherms of an activated carbon supported Ni/Mo catalyst calcined at 200° C.
Figure 9:
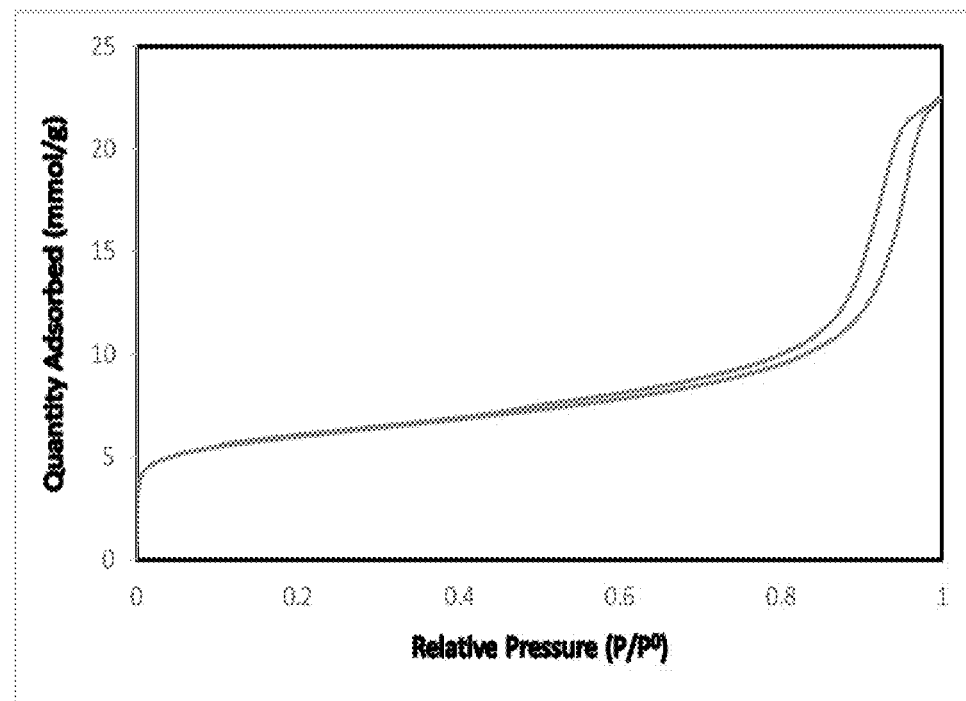
FIG. 9 represents N$_2$ adsorption-desorption isotherms of an activated carbon supported Ni/Mo catalyst calcined at 300° C.
Figure 10:
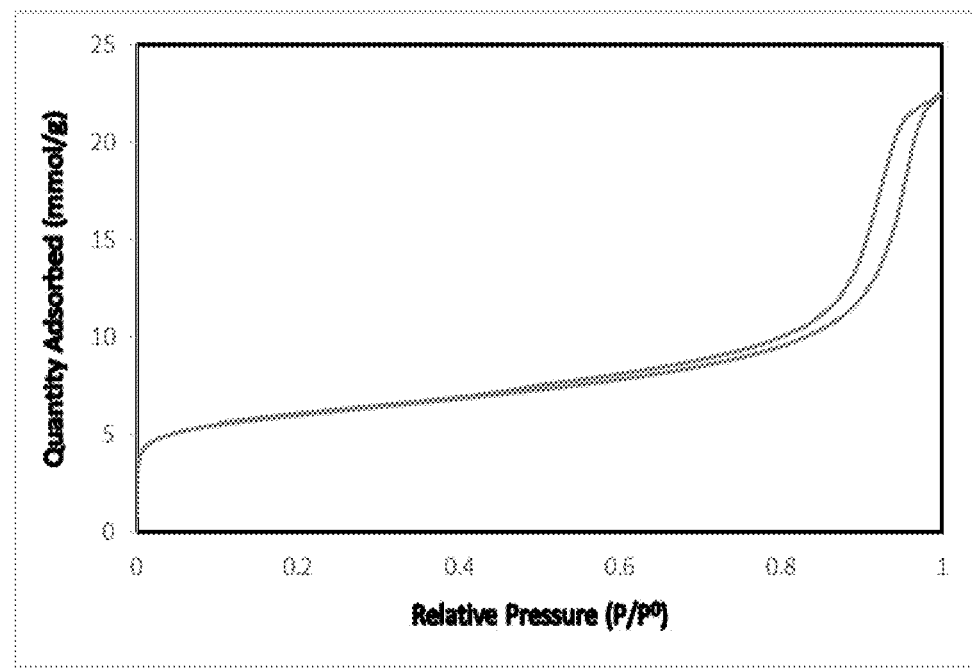
FIG. 10 represents N$_2$ adsorption-desorption isotherms of an activated carbon supported Ni/Mo catalyst calcined at 400° C.

Another interesting observation is the change in the average pore size of the support materials upon incorporation of the metal catalysts. After the impregnation with Ni and Mo species, average pore diameters of AC, TiO$_2$, and AC-TiO$_2$ increased from initial values of 52 Å (5.2 nm), 30 Å (3.0 nm), and 56 Å (5.6 nm) to 60 Å (6.0 nm), 31 Å (3.1 nm), and 86 Å (8.6 nm), respectively. The observed increase in pore diameter could be attributed to the occupation or blocking of some of the micro pores of the support materials by the metal nanoparticles, and thus leading to a decrease in the ratio of the micropores relative to the mesopores. Moreover, based on the shapes of the N$_2$ adsorption-desorption isotherms of the catalyst presented on FIGS. 4, 5, and 6, it is clear that NiMo/AC, NiMo/TiO$_2$, and NiMo/AC-TiO$_2$ materials are mesoporous.

Results for the textural properties of NiMo/AC100, NiMo/AC200, NiMo/AC300, and NiMo/AC400 are presented in Table. 3 In addition to the fact that the textural properties of the carbon support changed upon loading the supports with metal catalysts, analysis of the results show that there is a correlation between the textural property and the calcination temperature at which the prepared catalysts were treated after impregnation. NiMo/AC400 has the largest BET surface area of 434.5 m$^2$/g, which is significantly greater when compared with surface areas of 323, 352, and 356 m$^2$/g obtained for NiMo/AC100, NiMo/AC200, and NiMo/AC300, respectively. A similar trend is observed for the external surface area, micropore area, as well as the pore volumes of the supported HDS catalyst. The observation may be resulted from the fact that more effective evacuation of the adsorbed H$_2$O molecule trapped within the pores of the carbon support.

TABLE 3

Textural Properties of Catalysts: NiMo/AC100, NiMo/AC200 and NiMo/AC300 NiMo/AC400

| Catalysts | BET Surface Area (m$^2$/g) | External Surface Area (m$^2$/g) | Micropore Area (m$^2$/g) | Total pore volume of pores (cm$^3$/g) | Average pore diameter (Å) |
|---|---|---|---|---|---|
| NiMo/AC100 | 323.0251 | 220.0663 | 102.9588 | 0.529609 | 65.5811 |
| NiMo/AC200 | 356.6956 | 229.1308 | 127.5647 | 0.548710 | 61.5325 |
| NiMo/AC300 | 352.1114 | 230.7778 | 121.3336 | 0.530329 | 60.2456 |
| NiMo/AC400 | 434.5335 | 259.5915 | 174.9420 | 0.595631 | 54.8295 |

The N$_2$ adsorption-desorption isotherms for NiMo/AC100, NiMo/AC200, NiMo/AC300, and NiMo/AC400 are presented in FIGS. 7, 8, 9, and 10, respectively. The shapes of the isotherms are similar and match the type IV isotherms unique to the mesoporous material. Moreover, the average pore size (Table 4) of all the catalysts fall within the range of 2 nm to 50 nm. The average pore size recorded for NiMo/AC100, NiMo/AC200, NiMo/AC300, and NiMo/AC400 are 66 Å (6.6 nm), 62 Å (6.2 nm), 60 Å (6.0 nm), and 55 Å (5.5 nm), respectively. It is important to note that there is a decrease in the average pore size of the catalysts as the calcination temperature increases from 100 to 400° C. Though the difference in pore size might seem small, the difference becomes significant when the pore size of NiMo/AC400 is compared with others including NiMo/AC100, NiMo/AC200, and NiMo/AC300.

Results for the textural properties of NiMo/AC(U-S), NiMo/AC(CA), and NiMo/AC(EDTA) are presented in Table 4. The textural properties of the carbon support changed upon loading the supports with metal catalysts, similar to the cases of other catalysts discussed in the previous sections. Analysis of the results shows that there are differences in the measured BET surface area, external surface area, micropore area, and pore volume of the catalyst. NiMo/AC(EDTA) has the largest BET surface area of 342 m$^2$/g, compared to BET surface values of 278 and 288 m$^2$/g recorded for NiMo/AC(U-S) and NiMo/AC(CA), respectively. A similar trend is observed for the external surface area, micropore area, as well as pore volumes of the three supported HDS catalysts. The observed differences could be due to the fact that the chelating agents, CA and EDTA could be more effectively evacuated from the surface of the pores than adsorbed water.

TABLE 4

Textural Properties of Catalysts: NiMo/AC(U-S), NiMo/AC(CA) and NiMo/AC (EDTA)

| Catalysts | BET Surface Area (m$^2$/g) | External Surface Area (m$^2$/g) | Micropore Area (m$^2$/g) | Total pore volume of pores (cm$^3$/g) | Average pore diameter (Å) |
|---|---|---|---|---|---|
| NiMo/AC(U-S) | 278.7802 | 215.0349 | 85.7453 | 0.453232 | 61.1136 |
| NiMo/AC(CA) | 288.7802 | 205.0349 | 83.7453 | 0.441932 | 61.2136 |
| NiMo/AC(EDTA) | 342.8653 | 235.5285 | 107.3368 | 0.485952 | 56.6930 |

Figure 11:
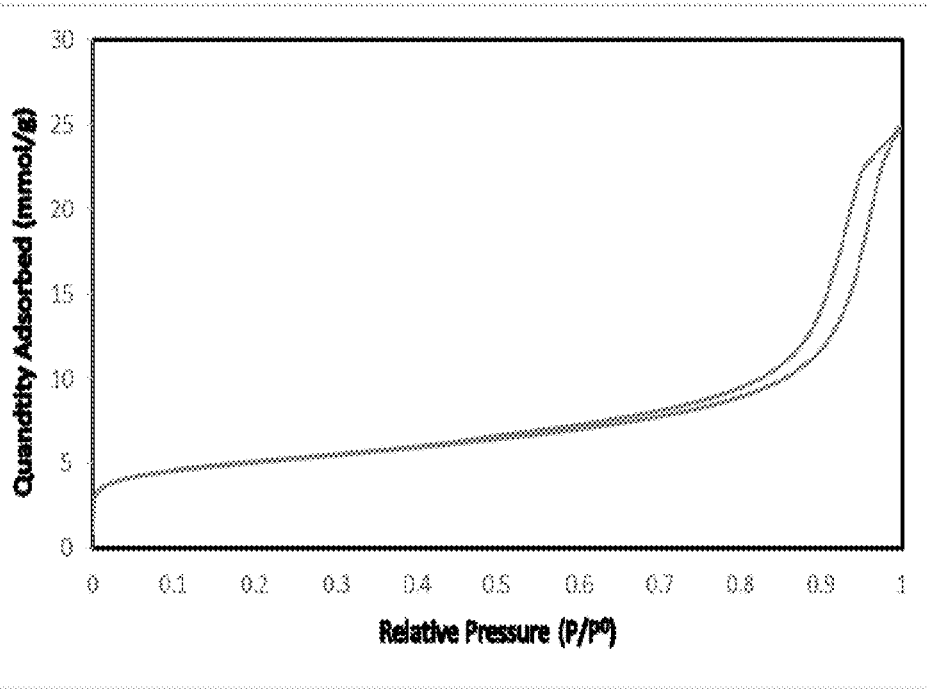
FIG. 11 represents N$_2$ adsorption-desorption isotherms of an activated carbon supported Ni/Mo catalyst prepared using ultrasonication.
Figure 12:
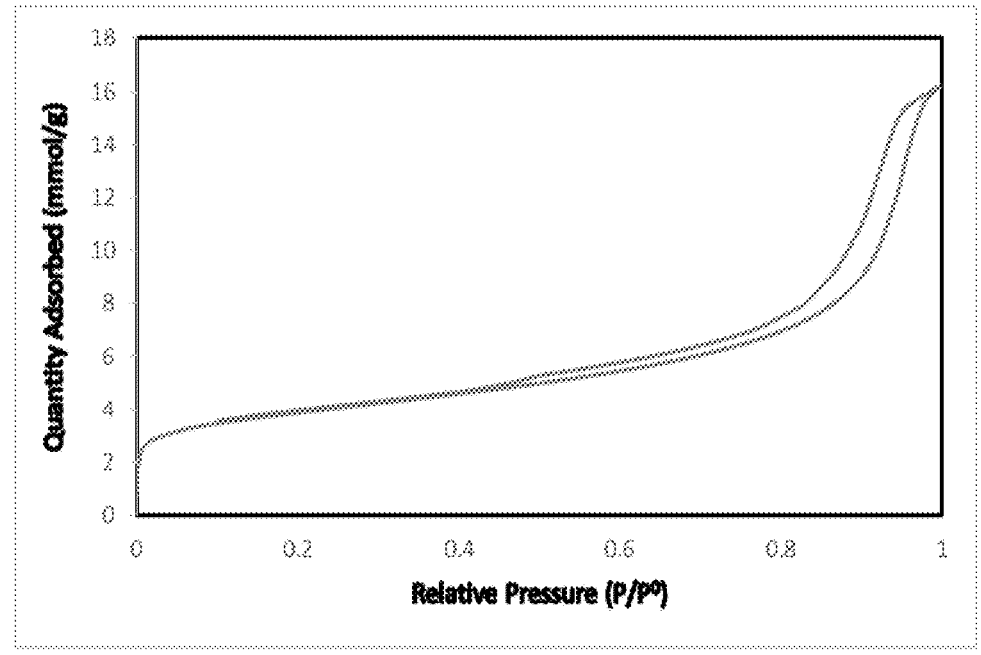
FIG. 12 represents N$_2$ adsorption-desorption isotherms of an activated carbon supported Ni/Mo catalyst prepared using citric acid.
Figure 13:
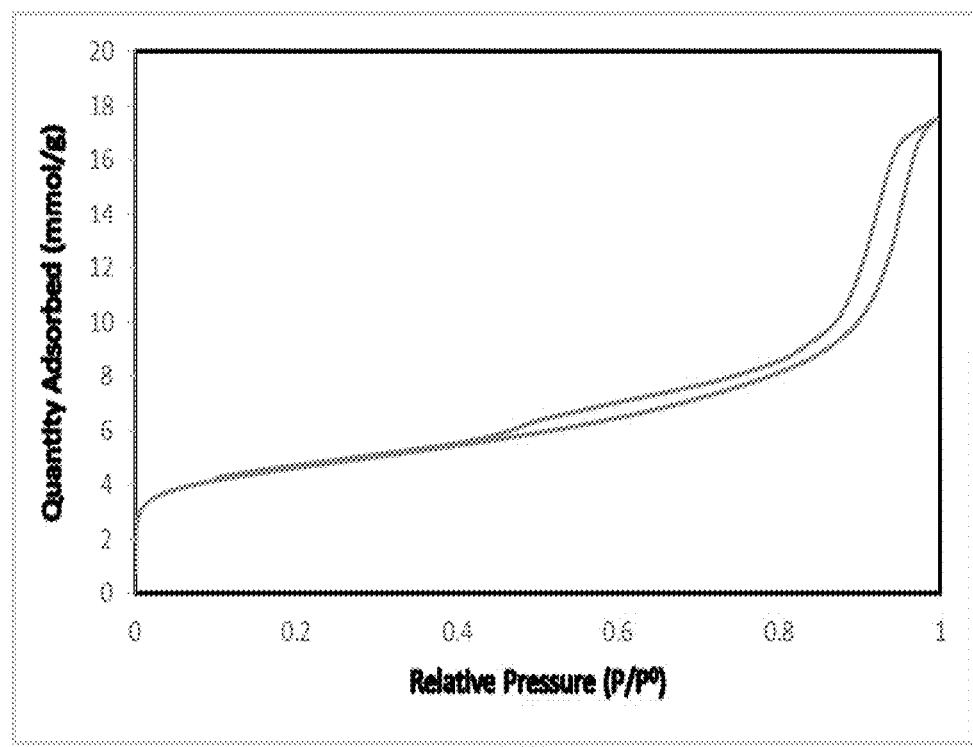
FIG. 13 represents N$_2$ adsorption-desorption isotherms of an activated carbon supported Ni/Mo catalyst prepared using ethylenediaminetetraacetic acid (EDTA).

Besides the changes observed in the surface area and pore volumes of the prepared catalysts when compared to the activated carbon support, there are noticeable changes in the pore size of the materials. The pore diameter of the activated carbon support was 5.2 nm compared to the 5.7, 6.1 and 6.1 nm recorded for NiMo/AC(U-S), NiMo/AC(CA) and NiMo/AC(EDTA) respectively. The average pore diameters of NiMo/AC(CA) and NiMo/AC(EDTA) are the same but larger than the average pore diameter of NiMo/AC(U-S). This is an indication that both CA and EDTA had similar effects on the textural properties of the prepared catalysts and their impacts might be different compared to the use of ultrasonication. In all cases, the average pore diameters of the catalysts are between the range of 2-50 nm and it shows that the materials are mainly mesoporous. It is evident from the shape of the N$_2$ adsorption-desorption isotherms presented in FIGS. 11, 12, and 13, that the three catalysts are mesoporous as the shapes are similar to the type IV isotherms peculiar to the mesoporous material.

Example 12

FT-IR Results

Figure 14:
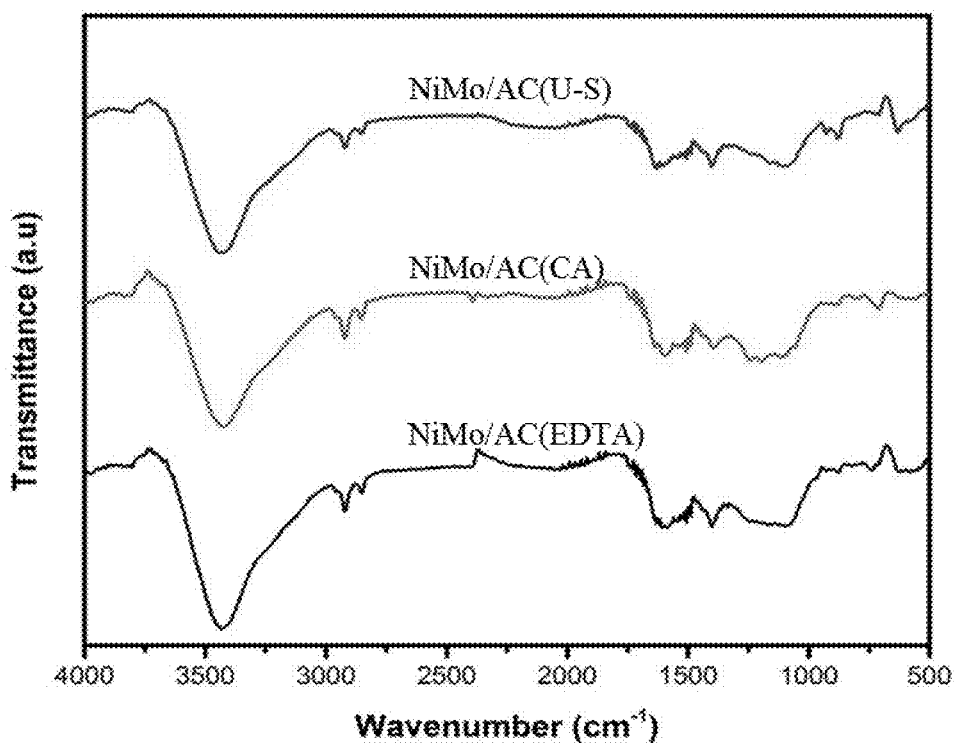
FIG. 14 is an overlay of FT-IR spectra of activated carbon supported Ni/Mo catalysts prepared using ultrasonication (NiMo/AC(U-S)), citric acid (NiMo/AC(CA)), and EDTA (NiMo/AC(EDTA)), respectively.
Figure 15:
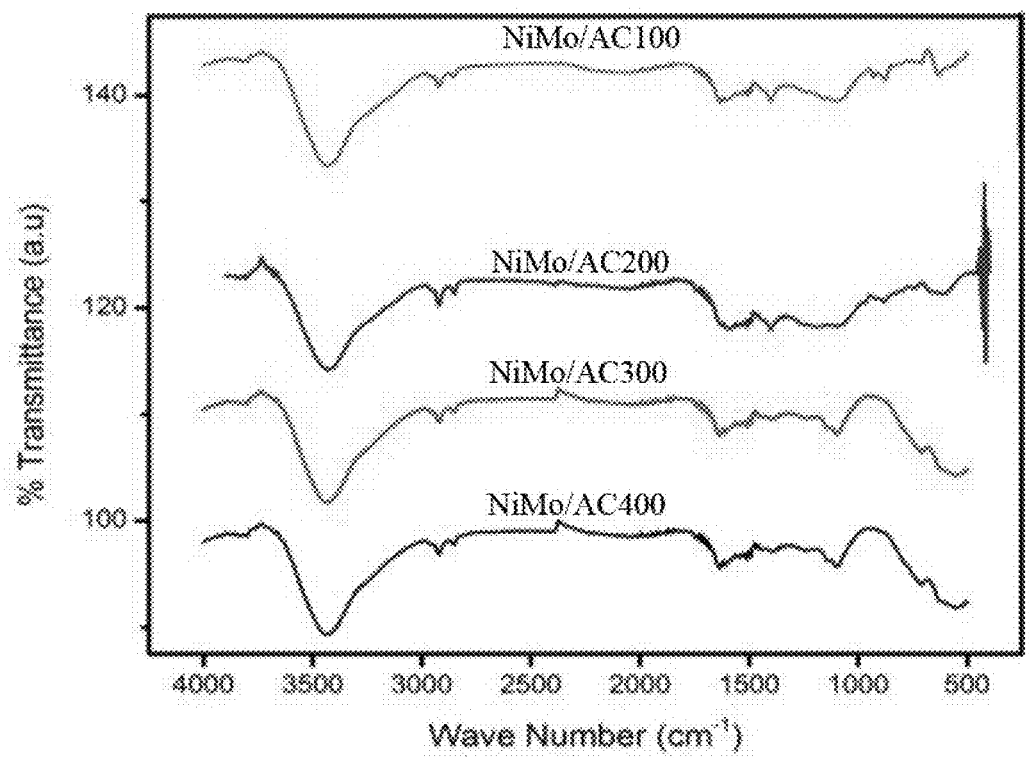
FIG. 15 is an overlay of FT-IR spectra of activated carbon supported Ni/Mo catalysts calcined at 100° C. (NiMo/

The FTIR spectra shown in FIGS. 14 and 15 reveal some of the functional groups present in the supported catalysts. The most conspicuous are the bands centered around 3400, 2350, 1600 and 1300-100 cm$^{-1}$. The broad band centered at 3400 cm$^{-1}$ is peculiar to the stretching (O—H) vibration in compounds with hydroxyl groups while the band at 2350, 1600 and 1300-100 cm$^{-1}$ are unique to the CC stretching vibration in alkyne group, (C=O) stretching vibrations of carboxylic and carbonyl compounds. This is a clear indication of the presence of acidic oxygen groups that can serve as adsorption sites on the surface of the catalysts. Peaks can be attributed to the Mo—O—Mo stretching vibrations are found at 620 and 850 cm$^{-1}$ while the band at 797 cm$^{-1}$ can be conveniently attributed to the presence of the polymobdate species, Mo$_{36}$.

Example 13

XRD Results

The powder X-ray diffraction results for the catalysts NiMo/AC100, NiMo/AC200, NiMo/AC300 and NiMo/AC400 are presented in FIG. 16. The diffractograms are stacked for ease of comparison. In all cases, there are three major broad diffraction peaks at 2θ values of 25°, 37° and 54°. However, the peaks for NiMo/AC300 and NiMo/AC400 are more intense when compared to NiMo/AC100 and NiMo/AC200. The appearance of these peaks can be attributed to presence of Mo species and the varying degree of intensity of the peaks is a result of the difference in degree of crystallinity. This is an indication that the calcination at high affects the degree of crystallinity of Mo incorporated into the carbon support. The other peaks are broad and barely visible but the most conspicuous diffraction peak at around 2θ 25° can be attributed to the hexagonal MoO$_3$ [C. Fontaine, Y. Romero, A. Daudin, E. Devers, C. Bouchy, and S. Brunet, "Insight into sulphur compounds and promoter effects on Molybdenum-based catalysts for selective HDS of FCC gasoline," *Appl. Catal. A Gen.*, vol. 388, no. 1-2, pp. 188-195, 2010; A. Tougerti, E. Berrier, A. S. Mamede, C. La Fontaine, V. Briois, Y. Joly, E. Payen, J. F. Paul, and S. Cristol, "Synergy between XANES Spectroscopy and DFT to Elucidate the Amorphous Structure of Heterogeneous Catalysts: TiO2-Supported Molybdenum Oxide Catalysts," *Angew. Chemie-Int. Ed.*, vol. 52, no. 25, pp. 6440-6444, 2013; and T. Bhaskar, K. R. Reddy, C. P. Kumar, M. R. V. S. Murthy, and K. V. R. Chary, "Characterization and reactivity of molybdenum oxide catalysts supported on zirconia," *Appl. Catal. A Gen.*, vol. 211, no. 2, pp. 189-201, 2001, each incorporated herein by reference in their entirety]. Diffraction peaks at 2θ values 20°-30° (002) 40° to 50° (101) have been reported for the graphite phase of activated carbon [L. J. Konwar, P. Maki-Arvela, E. Salminen, N. Kumar, A. J. Thakur, J. P. Mikkola, and D. Deka, "Towards carbon efficient biorefining: Multifunctional mesoporous solid acids obtained from biodiesel production wastes for biomass conversion," *Appl. Catal. B Environ.*, vol. 176-177, pp. 20-35, 2015; S. Kang, J. Ye, and J. Chang, "Recent Advances in Carbon-Based Sulfonated Catalyst: Preparation and Application," *Int. Rev. Chem. Eng.*, vol. 5, no. 2, pp. 133-144, 2013; and X. Y. Liu, M. Huang, H. L. Ma, Z. Q. Zhang, J. M. Gao, Y. L. Zhu, X. J. Han, and X. Y. Guo, "Preparation of a carbon-based solid acid catalyst by sulfonating activated carbon in a chemical reduction process," *Molecules*, vol. 15, no. 10, pp. 7188-7196, 2010, each incorporated herein by reference in their entirety]. The additional peaks can be attributed to the other forms MoO$_3$ or even MoO$_2$. Therefore the presence of these peaks can be taken as additional evidence of successful impregnation of the carbon support with the metal catalyst. There are no visible and peculiar peaks that indicate the presence of and Ni due to the low concentration of the promoter compared to the proportion Mo [A. Omri and M. Benzina, "Influence of the origin of carbon support on the structure and properties of $TiO_2$ nanoparticles prepared by dip coating method," *Arab. J. Chem.*, 2015, incorporated herein by reference in its entirety].

Example 14

SEM and EDX Results

The scanning electron microscopy (SEM) images in FIGS. 17 and 18 show surface morphology and textural characteristics of selected catalysts. It is important to note that the particles do not have a regular shape, which is a common feature of activated carbon and other amorphous materials used as adsorbent or catalysts support [Y. Wang and R. T. Yang, "Desulfurization of liquid fuels by adsorption on carbon-based sorbents and ultrasound-assisted sorbent regeneration," *Langmuir*, vol. 23, no. 7, pp. 3825-3831, 2007, incorporated herein by reference in its entirety]. Other porous materials like MOFs SBA-15 are often used as support and adsorbents with characteristic shapes and distinct morphology. It is obvious that some of the pores on the surface of the activated carbon support and metal particles on the surface are visible—an indication that some of the metals got deposited onto the surface of the carbon support and the others might be trapped inside the pores. FIG. 19 is an energy dispersive x-ray (EDX) spectrum. Table 5 provides both qualitative and quantitative information on the surface composition of the prepared catalysts. The identified elements present on the catalysts include carbon, oxygen, molybdenum, cobalt, and nickel. As the main component of the support material, it was not unexpected that carbon has the most intense peak and it represents over sixty percent of the elements. The peaks for oxygen and molybdenum are also conspicuous and account for approximately nine percent and seven percent, respectively. The above analysis is a clear indication that Mo, Co, and Ni in the form of nanoparticles were successfully incorporated onto the activated carbon support.

TABLE 5

Distribution of elements on the surface of the NiMo/AC

| Element | Line Type | Apparent Concentration | k Ratio | Wt % | Wt % Sigma |
|---|---|---|---|---|---|
| C | K series | 66.46 | 0.66463 | 81.81 | 0.54 |
| O | K series | 5.89 | 0.01982 | 9.02 | 0.49 |
| Ni | K series | 3.55 | 0.03547 | 1.52 | 0.13 |
| Zr | L series | 0.00 | 0.00000 | 0.00 | 0.00 |
| Mo | L series | 17.10 | 0.17096 | 7.64 | 0.27 |
| Total: | | | | 100.00 | |

Example 15

HDS Activity of Catalysts: Nature of Support Materials and HDS Activity

The catalytic performance of the prepared catalysts towards desulphurization of DBT for the reactions conducted in a pressure batch reactor is summarized in Table 6 and FIG. 20. In all cases, a continuous decrease in the concentration of DBT in the model fuel was observed as reactions progressed. There was a decrease in the concentration of DBT even at the zeroth hour when sampling begins, an indication that the hydrodesulphurization reaction starts before the reaction temperature reaches the desired set point of 350° C. Earlier reports have shown that HDS of DBT is feasible even at a lower temperature of 300° C. using the Mo based catalysts supported on carbon [H. Farag, I. Mochida, and K. Sakanishi, "Fundamental comparison studies on hydrodesulfurization of dibenzothiophenes over CoMo-based carbon and alumina catalysts," *Appl. Catal. A Gen.*, vol. 194-195, pp. 147-157, March 2000, incorporated herein by reference in its entirety].

TABLE 6

HDS Test Results: performance of NiMo/AC, NiMo/$TiO_2$, and NiMo/AC-$TiO_2$

| | Concentration of DBT in Products Sampled at intervals (ppm) | | | |
|---|---|---|---|---|
| Catalysts | Set Point (0 h) | 1 h | 2 h | 3 h |
| NiMo/AC | 740 | 491 | 266 | 109 |
| NiMo/$TiO_2$ | 607 | 465 | 391 | 228 |
| NiMo/AC-$TiO_2$ | 795 | 423 | 220 | 62 |

When comparing the concentrations of DBT in samples collected at the same interval for the three catalysts, it was observed that the concentrations are not the same. The concentration of the DBT was consistently lower in the case of NiMo/AC than when NiMo/$TiO_2$ and NiMo/AC-$TiO_2$ were used as catalysts for the HDS reaction. Such difference in catalytic performance can be attributed to the nature of the support material as the amount of Ni and Mo on the support materials remain the same. The obvious advantage of the carbon material over $TiO_2$ is its larger surface area and a different pore structure. Previous studies have shown that higher conversions could be achieved using materials with larger surface areas [M. Kouzu, Y. Kuriki, F. Hamdy, K. Sakanishi, Y. Sugimoto, and I. Saito, "Catalytic potential of carbon-supported NiMo-sulfide for ultra-deep hydrodesulfurization of diesel fuel," *Appl. Catal. A Gen.*, vol. 265, no. 1, pp. 61-67, 2004; N. Escalona, J. Ojeda, J. M. Palacios, M. Yates, J. L. G. Fierro, A. L. Agudo, and F. J. Gil-Llambias, "Promotion of Re/$Al_2O_3$ and Re/C catalysts by Ni sulfide in the HDS and HDN of gas oil: Effects of Ni loading and support," *Appl. Catal. A Gen.*, vol. 319, pp. 218-229, 2007; H. Farag, D. D. Whitehurst, K. Sakanishi, and I. Mochida, "Carbon versus Alumina as a Support for Co—Mo Catalysts Reactivity towards HDS of Dibenzothiophenes and Diesel Fuel," *Catal. Today*, vol. 50, no. 1, pp. 9-17, 1999, each incorporated herein by reference in their entirety]. Moreover, comparison study on carbon materials and metal oxides has shown that carbon materials with a large surface performed better than $TiO_2$ and $Al_2O_3$ [P. Gheek, S. Suppan, J. Trawczyński, A. Hynaux, C. Sayag, and G. Djega-Mariadssou, "Carbon black composites-supports of HDS catalysts," *Catal. Today*, vol. 119, no. 1-4, pp. 19-22, 2007; and P. A. Nikulshin, N. N. Tomina, A. A. Pimerzin, A. V. Kucherov, and V. M. Kogan, "Investigation into the effect of the intermediate carbon carrier on the catalytic activity of the HDS catalysts prepared using heteropolycompounds," *Catal. Today*, vol. 149, no. 1-2, pp. 82-90, 2010, each incorporated herein by reference in their entirety]. Another important observation is that when comparing the performance of NiMo/$TiO_2$ to NiMo/AC-$TiO_2$, a lower concentration of DBT was recorded for NiMo/AC-$TiO_2$ at all the time intervals. Thus, it is clear that the carbon from waste tires is a more effective support material for Ni and Mo when compared to $TiO_2$ and composite material $AC-TiO_2$.

HDS rate constants k ($s^{-1}$), k ($s^{-1}$ $g^{-1}$ cat.) and $R^2$ values were calculated for NiMo/AC, NiMo/TiO$_2$, and NiMo/AC-TiO$_2$ and presented in Table 7 and FIG. 21. The magnitude of the $R^2$ values ranges from 0.850 to 0.989, an indication that the reactions involving all the tested catalysts agree well with the proposed pseudo-first order kinetics for the desulfurization process using supported Mo catalysts [J. Chen, H. Yang, and Z. Ring, "HDS kinetics study of dibenzothiophenic compounds in LCO," in *Catalysis Today*, 2004, vol. 98, no. 1-2 SPEC. ISS., pp. 227-233, incorporated herein by reference in its entirety]. Calculations for the nth order rates yielded lower $R^2$ values. The results also show a strong correlation between the performance of the catalysts towards the desulfurization of DBT and the magnitude of the pseudo $1^{st}$ order rate constants. For example, the HDS rate constant for NiMo/AC(EDTA), NiMo/AC(CA), NiMo/AC(U-S), and NiMo/AC are 2.3×10$^{-4}$ s$^{-1}$, 1.8×10$^{-4}$ s$^{-1}$, 1.6×10$^{-4}$ s$^{-1}$, and 1.5×10$^{-4}$ s$^{-1}$, respectively. The difference in the magnitude of HDS rate constants reflects the relative performance of catalysts, and thus providing insight into the activity of the prepared catalysts. It is clear that NiMo/AC(EDTA) is the most effective among the prepared and tested catalysts in catalyzing degradation reaction of DBT. The magnitude of the HDS rate constants also indicates that the chelating agents are more effective in the dispersion of active metal species when compared to ultrasonication.

TABLE 7

Kinetic parameters: HDS rate constants for NiMo/AC, NiMo/TiO$_2$, and NiMo/AC-TiO$_2$

| | $1^{st}$ Order Kinetics Rate Constants | | | |
|---|---|---|---|---|
| Catalysts | $k_{HDS}$ ($s^{-1}$) | $k_{HDS} \times 10^4$ ($s^{-1}$) | $k_{HDS} \times 10^4$ ($s^{-1}g^{-1}$cat) | $R^2$ |
| NiMo/AC | 2.0E-04 | 2.0E+00 | 6.58 | 0.988 |
| NiMo/TiO$_2$ | 1.0E-04 | 1.00 | 3.33 | 0.965 |
| NiMo/AC-TiO$_2$ | 1.7E-04 | 1.73 | 5.75 | 0.985 |

Example 16

HDS Activity of Catalysts: Effects of Calcination Temperature

The results in Table 8 and FIG. 22 demonstrate the concentration of sulfur present in the model at various time intervals during the reaction using different catalysts NiMo/AC100, NiMo/AC200 and NiMo/AC300, or NiMo/AC400. Different concentrations of sulfur at the same time intervals using the catalysts calcined at different temperatures are an indication that the activity of the catalysts was also affected by the thermal treatment. Considering the concentration profiles of the products collected at different hours of the experiments, it is clear that catalysts calcined at 100° C. and 200° C. are more effective in the HDS of DBT. There is a significant difference between the sulfur concentration of products collected at the same reaction time for the catalysts prepared from the same materials and under similar conditions except for calcination temperature. Thus, it would be rational to attribute the difference in activity of the catalysts to modifications that occur during the calcination process. Some functionalities and features that facilitate the operation of the catalyst may be lost at a higher calcination temperature. Recent studies on SBA-15 supported NiMo showed that higher activity could be achieved when catalysts were calcined at 300° C. rather than at higher temperatures [S. A. Ganiyu, K. Alhooshani, and S. A. Ali, "Single-pot synthesis of Ti-SBA-15-NiMo hydrodesulfurization catalysts: Role of calcination temperature on dispersion and activity," *Appl. Catal. B Environ.*, vol. 203, pp. 428-441, 2017, incorporated herein by reference in its entirety]. It is noted that the two catalysts, CMAC and NMAC, also performed better with treatment at 300° C. The two catalysts showed insignificant difference in activity when they were calcined at the same temperature.

TABLE 8

HDS test results: performance of NiMo/AC100, NiMo/AC200, NiMo/AC300, and NiMo/AC400

| | Concentration of DBT in of products taken at intervals (ppm) | | | |
|---|---|---|---|---|
| Catalysts | Set point (0 h) | 1 h | 2 h | 3 h |
| NiMo/AC100 | 713 | 546 | 112 | 49 |
| NiMo/AC200 | 740 | 512 | 122 | 60 |
| NiMo/AC300 | 882 | 658 | 385 | 147 |
| NiMo/AC400 | 840 | 691 | 366 | 153 |

The HDS rate constants k ($s^1$), $ks^{-1}$ $g^{-1}$ cat. $R^2$ values were calculated for all the prepared catalysts including NiMo/AC100, NiMo/AC200, NiMo/AC300, and NiMo/AC400, and the results are presented in Table 9. The values were determined using the initial conversion values obtained after the first hour of the reaction. The magnitude of $R^2$ values ranges from 0.850 to 0.989, indicating that the reactions involving all the tested catalysts agree well with the proposed pseudo-first order kinetics for the desulfurization process using supported Mo catalysts. Calculations for the nth order rates yielded lower $R^2$ values.

A similar trend is observed in the relative magnitude of the catalysts subjected to thermal treatments at different temperatures prior to the reduction, presulfidation, and the subsequent HDS activity tests as described in the previous sections. The pseudo $1^{st}$ order rate constant calculated for NiMo/AC100, NiMo/AC200, NiMo/AC300, and NiMo/AC400 are 2.0×10$^{-4}$ s$^{-1}$, 1.9×10$^{-4}$ s$^{-1}$, 8.8×10$^{-5}$ s$^{-1}$, and 8.9×10$^{-5}$ s$^{-1}$, respectively (FIGS. 23A-D). The decrease in the magnitude of the rate constant with increasing calcination temperature is a clear indication that calcination at higher temperatures reduces the activity of the catalyst. The observed phenomenon can be attributed to the enhanced crystallinity of the active species as shown in XRD spectra.

TABLE 9

Kinetic parameters: HDS rate constants for NiMo/AC 100, NiMo/AC200, NiMo/AC300, and NiMo/AC400

| | $1^{st}$ Order Kinetics Constants | | | |
|---|---|---|---|---|
| Catalysts | $k_{HDS}$ ($s^{-1}$) | $k_{HDS} \times 10^4$ ($s^{-1}$) | $k_{HDS} \times 10^4$ ($s^{-1}g^{-1}$cat) | $R^2$ |
| NiMo/AC100 | 2.0E-04 | 1.52 | 5.05 | 0.972 |
| NiMo/AC200 | 1.9E-04 | 1.9E+00 | 6.18 | 0.997 |
| NiMo/AC300 | 8.8E-05 | 0.88 | 2.92 | 0.980 |
| NiMo/AC400 | 8.9E-05 | 0.89 | 2.97 | 0.989 |

Example 17

HDS Activity of Catalysts: Effects of Ultrasonication and Chelating Agents

The results of HDS activity tests for all materials are presented in Table 10. Analysis of the results shows that there is a significant difference in the performance of each catalyst towards the HDS of DBT (FIG. 24). It is evident that NiMo/AC(EDTA) is the most effective catalyst among the three in the NiMo series. The concentration of sulfur is reduced to less than 10 ppm for the reaction involving NiMo/AC(EDTA) while the concentration of sulfur in aliquots obtained using NiMo/AC(CA) or NiMo/AC(U-S) was above 50 ppm at the same time interval. Comparison of the sulfur concentration in aliquots from reactions involving NiMo/AC(CA) and NiMo/AC(U-S) reveals that more efficient DBT HDS was achieved with catalysts prepared using citric acid rather than ultrasonication for enhanced dispersion. Analysis on the CoMo/AC series showed a similar performance pattern while the concentrations of sulfur in all the aliquots were much lower compared to the NiMo/AC. For example, the concentration of sulfur was reduced to below detectable limit using CoMo/AC(CA), while the concentration was above 5 ppm in the case of the reactions involving NiMo/AC(EDTA) at the third hour. The observed trend is an indication that EDTA is more effective in dispersing the active phase compared to ultrasonication or citric acid.

TABLE 10

HDS test results: performance of MAC, NMAC, and CMAC catalysts

| Catalysts | Concentration of DBT in products taken at intervals (ppm) | | | |
|---|---|---|---|---|
| | Set point (0 h) | 1 h | 2 h | 3 h |
| NiMo/AC(U-S) | 520 | 359 | 305 | 78 |
| NiMo/AC(CA) | 703 | 377 | 166 | 75 |
| NiMo/AC(EDTA) | 634 | 364 | 141 | 36 |

Results for the kinetics study of NiMo/AC(U-S), NiMo/AC(CA), and NiMo/AC(EDTA) are presented in Table 11. HDS rate constants k ($s^{-1}$), $ks^{-1}$ $g^{-1}$ cat. and $R^2$ values were calculated for the three catalysts. The magnitude of the $R^2$ values ranges from 0.850 to 0.989, an indication that the reactions involving all the tested catalysts agree well with the proposed pseudo-first order kinetics for the desulfurization process using supported Mo catalysts. Calculations for the nth order rates yielded lower $R^2$ values. The results also show a strong correlation between the performance of the catalysts towards the desulfurization of DBT and the magnitude of the pseudo $1^{st}$ order rate constants. For example, the HDS rate constant for NiMo/AC(EDTA), NiMo/AC(CA), NiMo/AC(U-S), and NiMo/AC are $2.3 \times 10^{-4}$ $s^{-1}$, $1.8 \times 10^{-4}$ $s^{-1}$, $1.6 \times 10^{-4}$ $s^{-1}$, and $1.5 \times 10^{-4}$ $s^{-1}$, respectively (FIGS. 25A-C). The differences in the magnitude of HDS rate constants reflect the relative performance of the catalysts, and provide more insight into the activity of the prepared catalysts. It is now clear that NiMo/AC(EDTA) is the most effective of the prepared and tested catalysts for degradation of DBT. The magnitude of the HDS rate constants also indicates that the chelating agents are more effective in dispersing active metal species compared to ultrasonication.

TABLE 11

Kinetic parameters: HDS rate constants for NiMo/AC(U-S), NiMo/AC(CA), and NiMo/AC(EDTA)

| | $1^{st}$ Order Kinetics Constants | | | |
|---|---|---|---|---|
| Catalysts | $k_{HDS}$ ($s^{-1}$) | $k_{HDS} \times 10^4$ ($s^{-1}$) | $k_{HDS} \times 10^4$ ($s^{-1} g^{-1}$ cat) | $R^2$ |
| NiMo/AC(U-S) | 1.6E-04 | 1.6E+00 | 5.22 | 0.921 |
| NiMo/AC(CA) | 1.8E-04 | 1.84 | 6.15 | 0.850 |
| NiMo/AC(EDTA) | 2.3E-04 | 2.26 | 7.53 | 0.981 |

Example 18

CONCLUSIONS

A family of Mo based catalysts supported on activated carbon derived from waste tires, $TiO_2$, and AC-$TiO_2$ composites were prepared and applied in the HDS of DBT. The catalysts were characterized by various techniques including $N_2$-physisorption, X-ray diffraction (XRD), and FT-IR. The HDS activity of the catalyst was tested in a pressure batch reactor using decalin spiked with dibenzothiophene as model fuel. The activity of the catalyst was found to be dependent on the compositions of catalysts and support materials as well as the preparation methods.

The activated carbon support was found to be the most effective for the catalysts when compared with $TiO_2$ and AC-$TiO_2$ composite supports. Results from the characterization and the catalytic activity tests show that chelating agents were more effective in the dispersion of the active phase and the highest HDS activity was observed when EDTA was used.

Direct desulfurization was achieved using the Mo based catalysts, and the most efficient reaction route and desulfurization of the DBT was achieved with NiMo/AC, especially when EDTA was used to aid the dispersion of the active phase.

The invention claimed is:

1. A method of producing a Ni/Mo hydrodesulfurization catalyst, the method comprising:
   dissolving an Ni(II) salt in water to form a first solution;
   dissolving an Mo(VI) salt in water to form a second solution;
   granulating and pyrolyzing waste tires to form a first activated carbon, adding a first mixture comprising ethanol, water and $TiCl_4$ to a second mixture comprising water and the first activated carbon to form a third mixture, then adding ammonia to the third mixture to form a gel, then drying the gel to form a dry Ti-activated carbon,
   adding the dry Ti-activated carbon to the first and second solutions to form a fourth mixture;
   drying the fourth mixture at a temperature of 50-150° C. thereby producing a solid; then
   calcining the solid at a temperature of 160-500° C. to form the Ni/Mo hydrodesulfurization catalyst,
   wherein:
   the Ni/Mo hydrodesulfurization catalyst comprises nickel and molybdenum disposed on the Ti-activated carbon;
   the Ni/Mo hydrodesulfurization catalyst is mesoporous with a BET surface area of 250-500 $m^2/g$, an average pore diameter of 4-10 nm, and a pore volume of 0.2-3 $cm^3/g$; and
   the Mo(VI) salt is ammonium heptamolybdate (VI).

2. The method of claim 1, wherein the Ni/Mo hydrodesulfurization catalyst is calcined at a temperature of 160-200° C.

3. The method of claim 1, wherein the fourth mixture further comprises a chelating agent which is citric acid.

4. The method of claim 1, further comprising subjecting the fourth mixture to ultrasonication.

5. The method of claim 1, wherein the Ni/Mo hydrodesulfurization catalyst has an activated carbon content in a range of 60-95% by weight relative to a total weight of the Ni/Mo hydrodesulfurization catalyst.

6. The method of claim 1, wherein the Ni(II) salt is nickel(II) acetate.

7. The method of claim 1, wherein the Ni/Mo hydrodesulfurization catalyst has a Ni:Mo molar ratio in a range of 1:10 to 1:2.

8. The method of claim 1, wherein the Ni/Mo hydrodesulfurization catalyst has a Mo content in a range of 4-20% by weight relative to a total weight of the Ni/Mo hydrodesulfurization catalyst.

\* \* \* \* \*